United States Patent [19]

Ebner et al.

[11] Patent Number: 4,691,987
[45] Date of Patent: Sep. 8, 1987

[54] OPTICAL FIBER CABLE PRODUCER AND METHOD OF BONDING OPTICAL FIBERS TO LIGHT EMITTING DIODES

[75] Inventors: Peter R. Ebner, Hollis; Emanual C. Ebner, Jr., Hudson, both of N.H.; John H. Shaw, Manomet, Mass.; John G. Miller, Mont Vernon; Donald E. Gorelick, Nashua, both of N.H.

[73] Assignee: Itek Graphix Corp., Waltham, Mass.

[21] Appl. No.: 512,403

[22] Filed: Jul. 8, 1983

[51] Int. Cl.⁴ .................... G02B 6/44; H01J 5/16; B65H 69/02

[52] U.S. Cl. .................... 350/96.23; 350/96.24; 350/320; 250/227; 156/158; 156/160; 156/161

[58] Field of Search .................. 174/16 HS, 50, 50.62, 174/52 R, 52 PE, 52 H, 68 R, 71 R, 72 C, 72 TR, 117 F, 117 R; 357/81, 17, 74, 76, 18; 264/1.4, 1.5, 1.6, 1.7, 2.2, 2.3, 2.4, 2.5; 62/3; 165/80.2, 80.3; 350/320, 96.26, 96.28, 96.10, 96.15, 96.20, 96.21, 96.23, 96.24, 96.25; 250/227; 156/158, 159, 160, 161, 433, 434

[56] References Cited

U.S. PATENT DOCUMENTS

| | | | |
|---|---|---|---|
| 2,877,501 | 3/1959 | Bradt | 350/96.24 |
| 3,043,910 | 7/1962 | Hicks, Jr. | 350/96.27 |
| 3,069,682 | 12/1962 | Reese | 346/107 R |
| 3,193,363 | 7/1965 | Hicks, Jr. | 350/96.24 |
| 3,466,514 | 6/1967 | Brunner et al. | 219/158 |
| 3,498,864 | 3/1970 | Ogle | 350/96.27 |
| 3,626,423 | 12/1971 | Ameen | 346/107 R |
| 3,781,555 | 12/1973 | Keefe | 250/227 |
| 3,968,564 | 7/1976 | Springthorpe | 29/580 |
| 4,000,495 | 12/1976 | Pirtle | 354/7 |
| 4,125,798 | 11/1978 | Miller | 318/574 |
| 4,186,994 | 2/1980 | Denkin | 350/96.17 |
| 4,225,213 | 9/1980 | McBride, Jr. et al. | 250/227 |
| 4,230,898 | 10/1980 | Emmel | 350/96.23 |
| 4,318,873 | 3/1982 | Porter | 264/1.5 |
| 4,322,737 | 3/1982 | Sliwa, Jr. | 357/81 X |
| 4,338,577 | 7/1982 | Sato et al. | 372/36 |
| 4,342,504 | 8/1982 | Ebner | 354/7 |
| 4,378,149 | 3/1983 | Ebner | 354/5 |
| 4,402,185 | 9/1983 | Perchak | 62/3 |

FOREIGN PATENT DOCUMENTS 2097184 10/1982 United Kingdom .................... 62/3

OTHER PUBLICATIONS

Zeskind, "Thermoelectric Heat Pumps Cool Packages Electronically", Electronics, vol. 53, No. 17, 7/80, pp. 109–113.
Beldring et al, "Fiber Optic Sensor ... Devices", Western Elect. Pub. No. 33, 1/74, pp. 11 and 12.
Application Note, Corning Glass Works, Corning, NY, F. Quan.

*Primary Examiner*—William L. Sikes
*Assistant Examiner*—Brian M. Healy

[57] ABSTRACT

In a flexible, fiber optic belt 16 for the coherent transmission of light from an LED light source 22 a planar array of fiber optic filaments 34 extend along the length of the belt 16 and are positioned by transverse elements 79 along the major neutral plane of the belt. The fiber optic belt 16 is restrained to movement only in the direction normal to the major neutral plane by means of one or more rigid flat strips 25 parallel to the major neutral plane and the light source 22 is thermoelectrically cooled to improve the availability of light supplied by the diodes. In a method for producing the fiber optic cable, transverse positioning elements 79 are layered on a cable mold 56, one or more fiber optic filaments 34 are placed upon the transverse positioning elements 79. Fiber optic filaments 34 are pressed onto an adhesive layer adjacent to the LED's 48 and bonded by the melting of the adhesive. The fiber optic filaments 37 and transverse positioning elements 79 are later encapsulated in a molded flexible belt 16. An automated fiber optic cable producer is characterized by an elongated fiber optic cable mold 56, an emitter array 180 fixed to that mold, and a fiber feed mechanism mounted on a fiber carrier 94 for movement relative to the fiber optic cable mold 56. The carrier 94 is used for bonding the end of a fiber optic filament 34 on an emitter 48 in the emitter array 180 and routing the filament along the mold 56 to a transmitting head 26.

12 Claims, 24 Drawing Figures

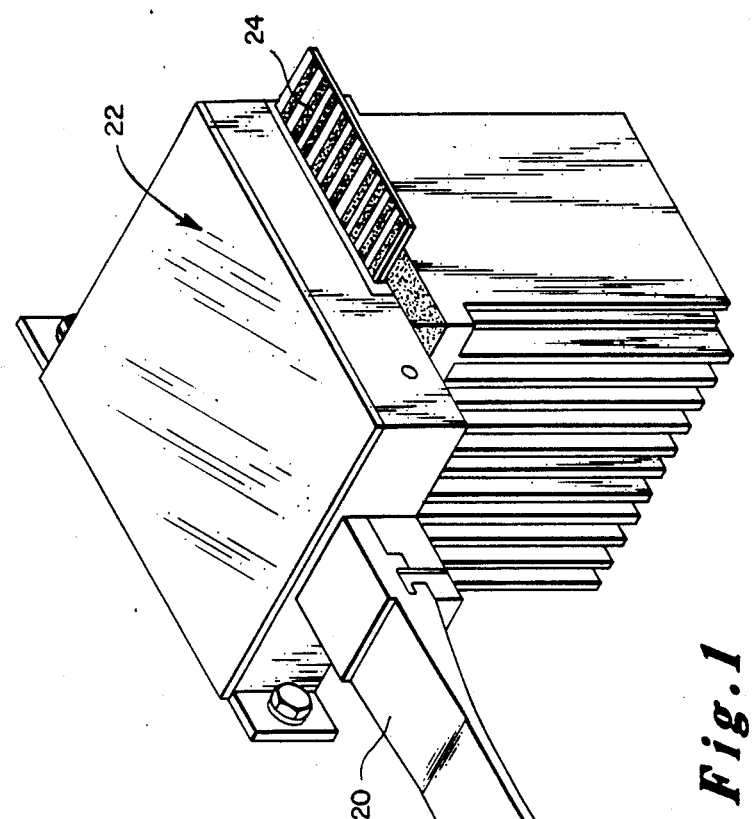
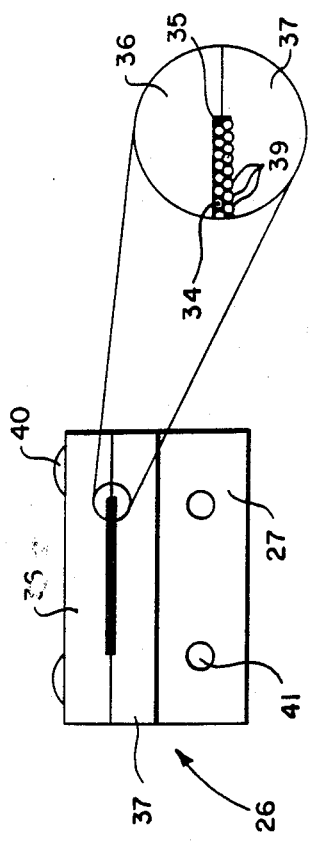
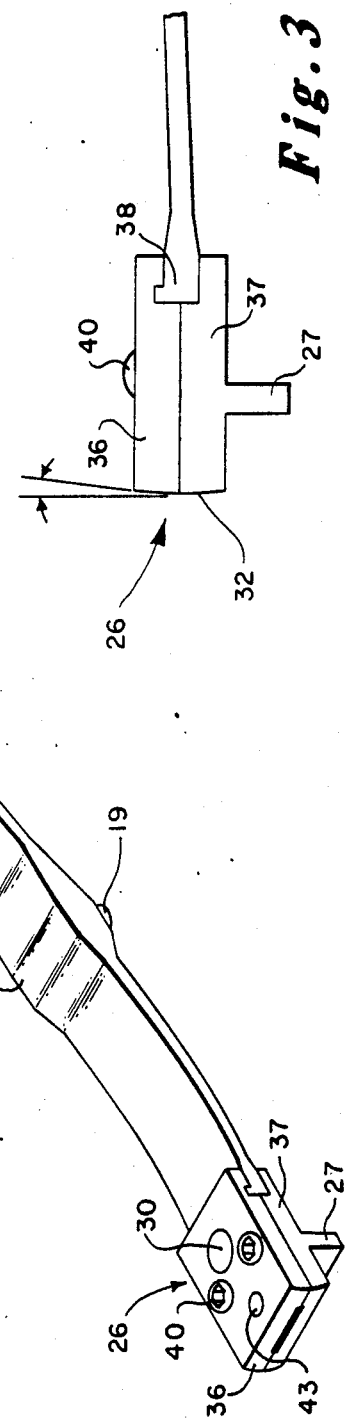

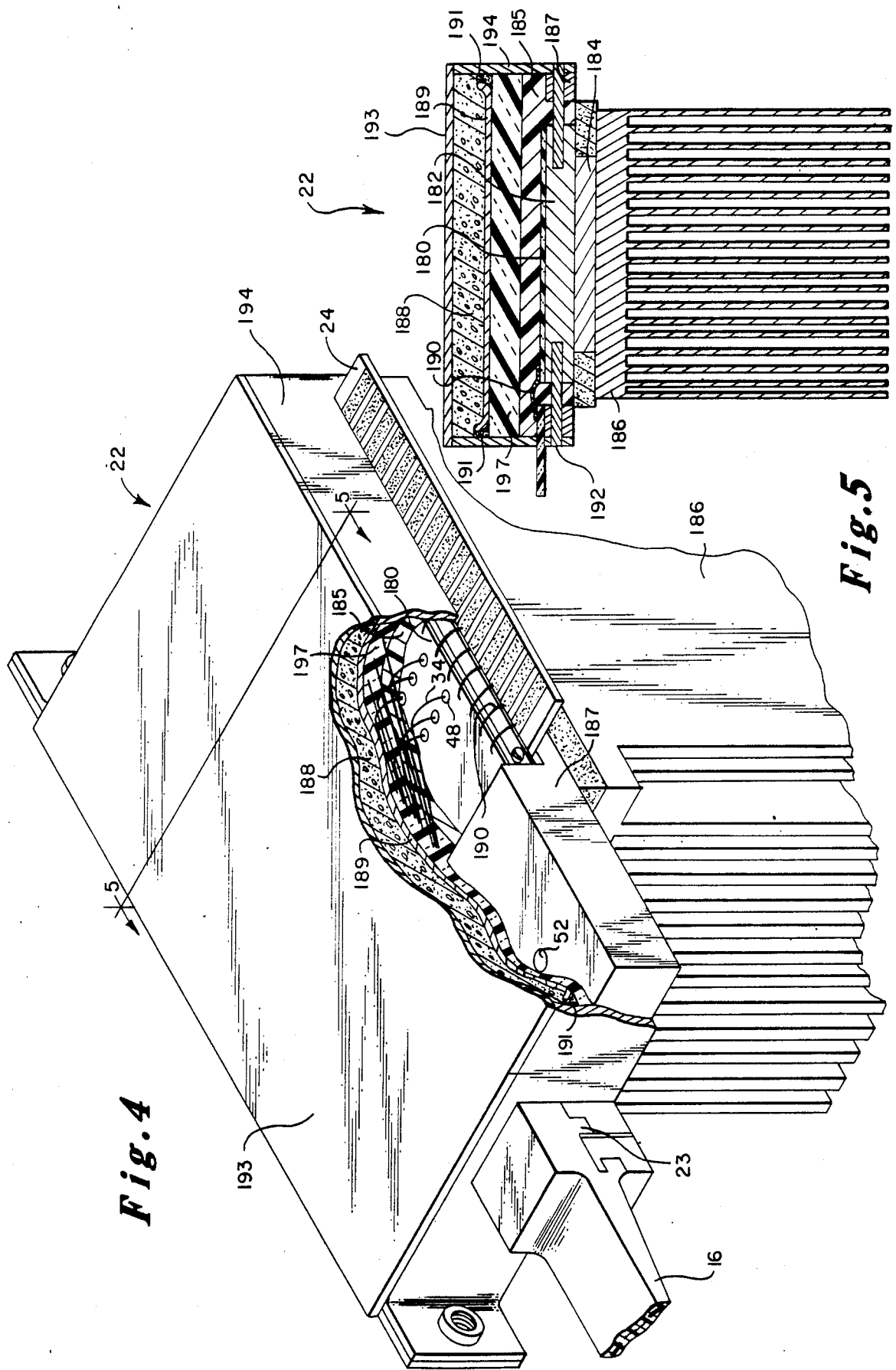

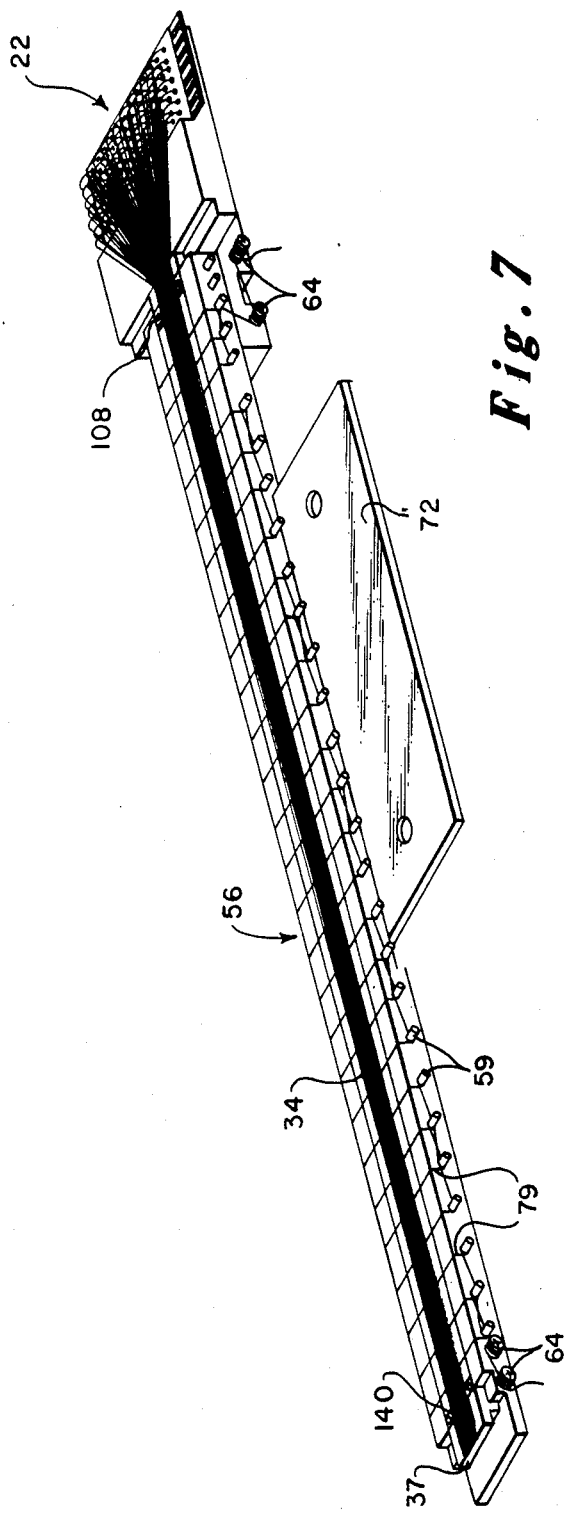
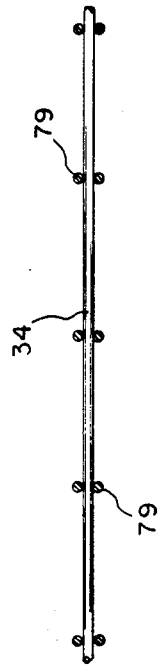
Fig. 7
Fig. 8

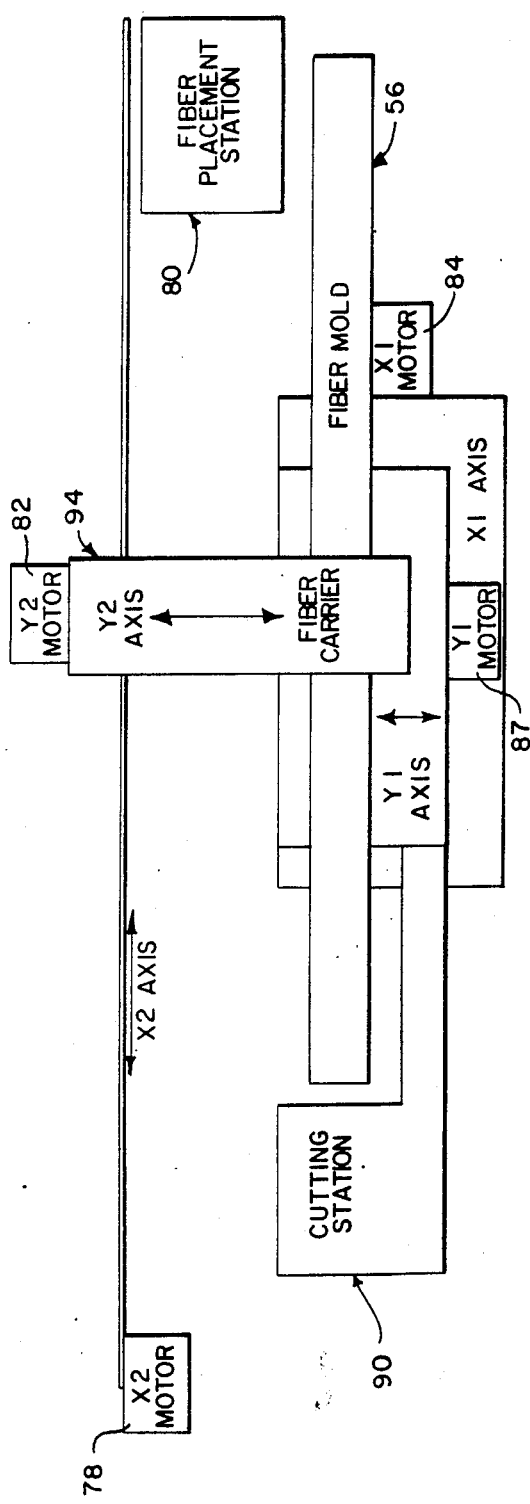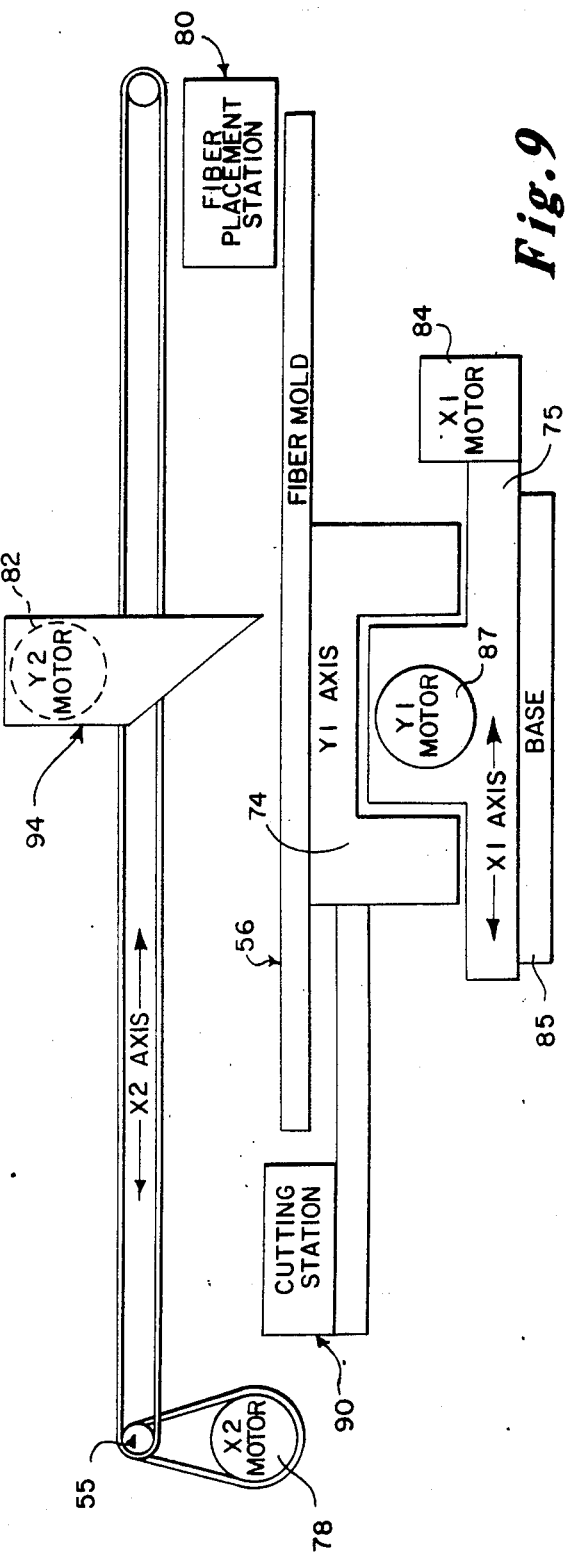

OPTICAL FIBER CABLE PRODUCER AND METHOD OF BONDING OPTICAL FIBERS TO LIGHT EMITTING DIODES

BACKGROUND

This invention relates to fiber optic cables, the fabrication of such cables, and in particular to such cables which are useful in graphic imaging systems such as phototypesetters.

During the last 30 years, numerous so-called second generation phototypesetters have been marketed. These machines flash-illuminate characters positioned upon a whirling character disk or drum, and the resulting optical image is projected by a lens system upon a photosensitive film. The size of the characters are changed by means of moving zoom lenses or the like or by rotating a lens turret to position various lenses at the optical projection axis. The characters are sequentially recorded upon the photosensitive film by mechanically scanning such film. The film carriage may be moved relative to the optical axis, the projection lenses may be moved relative to the film platen, the whirling character disk may be moved relative to the film platen, or various combination of the foregoing may be employed to sequentially project the characters upon the film to form a line of characters. Generally, the projection lens carriage assemblies are relatively heavy and bulky, as is the drum or disk bearing the images of the characters to be projected. Also, changes in the fonts involve manual replacement of the character disks, or film strips mounted upon a drum. Additionally, the electromechanical stepping devices for producing the above mentioned scanning motions are also relatively bulky and cumbersome. The speed of second generation machines is limited by the output carriage escapement speed and by character access time determined by the rotational speed of the font disk.

So-called third generation phototypesetters were introduced in the 1960s, most of which utilize cathode ray tubes for generating the characters upon the faces of the tubes. These character images are thereafter optically projected upon the film. In contrast with the components of the second generation machines, the electron beam is essentially unhindered by inertia and the computer codes thus may actuate the beam at much higher speeds than those obtainable by the second generation machines. Laser generated light beams have also been employed rather than cathode ray tubes. Many font families may be generated by these machines since the character generating codes may be densely packed during recordation upon magnetic storage media, such as floppy disks. Also, the character size may be electronically changed by changing the length of the beam traces making up the character components (See FIG. 1 of U.S. Pat. No. 3,952,311).

The result of the foregoing is that these machines have higher speeds, and greater flexibility in the character shapes and sizes produced. However, the third generation machines are usually considerably more expensive than the second generation machines; in 1979, they typically sold for $40,000 on up. In contrast, second generation machines in 1979 were marketed for around $10,000.

A fourth generation typesetter is disclosed in U.S. patent application Ser. No. 181,312 filed Aug. 25, 1980, now U.S. Pat. No. 4,342,504 by Peter Ebner, for an LED-fiber-optic character printer. The fourth generation typesetter can be marketed for about $10,000, and yet it has the speed and flexibility of the third generation machines. These results have been accomplished by providing a flexible ribbon of a small number of fiber optic filaments. Each filament is illuminated by one of a matrix of light emitting diodes (LEDs) and has its output end positioned within a printing head. The printing head has at least one relatively short linear array of fiber optic filaments embedded therein. Means are provided for causing the head to scan across the photosensitive material and to record a line of type thereon with light provided by selective energizing of the LEDs. The invention claimed in the above application utilizes a loop of fiber optic cable comprising fiber optic filaments mounted upon a belt-like substrate. This flexible fiber optic loop enables rapid scanning by the printing head with a fiber optic cable containing a drastically reduced number of fiber optic filaments, for example, 128, in contrast with the thousands of filaments called for by prior cables in general usage. With use, it has been found that continued flexing of the fiber optic cable causes stress of the fiber optic filaments.

A principle object of the present invention is to provide an improved fiber optic cable and a method and apparatus for producing it. Construction of a fiber optic cable and LED matrix assembly in which microscopic fiber optic filaments are connected to very small light emitting diodes is extremely difficult. The filaments themselves are fragile and subject to breakage. Light emitting diodes have a limitation as to their intensity, and for that reason it is extremely important to place each fiber optic filament input end as near as possible to the most intense emitting area of an LED. Placement of a 0.002 inch fiber filament end upon a roughly 0.005 inch square or circular emitting area requires precision placement within 0.001 inches of the target.

An object of this invention is to provide a method and apparatus for the precision placement of fiber optic filaments at the maximum light emitting areas of each LED.

The fourth generation phototypesetter is to be a mass produced machine and, as with all massed produced, economically viable machines, parts included in the machine must also be mass produced and must be functionally identical. A photo-optic cable to be used in such a machine with a small number of fiber optic filaments and light emitting diodes must respond in the same way as the part which it is replacing.

It is a further object of the invention to provide a relatively inexpensive method and apparatus of producing operationally identical cables having a number of fragile fiber optic filaments, each precisely associated within an LED matrix, and a printing head, positioned in such a manner that the fibers see little stress.

DISCLOSURE OF THE INVENTION

A fiber optic cable embodying this invention comprises a flexible belt wherein a planar array of fiber optic filaments extends along the length of the belt and is positioned along the major neutral place of the belt. In the preferred embodiment, the fiber optic filaments that extend along the length of the belt are positioned along the major neutral plane by transverse lacing embedded within the belt. The fiber optic belt may be restrained to bending only in the direction normal to the major neutral plane by means of one or more rigid flat strips parallel to the major neutral plane.

There are several refinements to the preferred embodiment which may be listed separately. The include routing two or more layers of fiber optic filaments in or about the neutral plane, and forming the belt about the filament by means of injection molding of elastomeric material. Selective illumination of the fiber optic filaments is by means of an integral matrix of light emitting diodes. The light source is thermo-electrically cooled to improve the availability of light supplied by the diodes.

The fiber optic belt is made more useful by the inclusion of an integral transmitting head into which the generally planar array of fiber optic filaments extend. Light is transmitted at the transmitting head from the filaments which are arranged in a predetermined relationship relative to the light emitting diodes The preferred embodiment includes a polished transmitting face in which the filaments have been embedded in a potting material. The face is angled recessively above and below the plane of the fiber optic filaments.

A novel method for construction of the fiber optic cable is disclosed. The method for producing a fiber optic cable includes laying a first set of transverse positioning elements on a cable mold and then placing one or more layers of fiber optic filaments upon the transverse positioning elements. In a final step, the fiber optic filaments and transverse positioning elements are encapsulated in a molded flexible belt.

In the preferred embodiment of the method of construction, a second set of transverse positioning elements may be spaced from the first set in such a manner as to provide routing of the fiber optic filaments on or about the neutral axis of the belt when the filaments are encapsulated. A further refinement of the method includes embedding rigid steel strips parallel with the routing of the fiber optic filaments so as to restrain flexing of the belt to only the direction normal to the major neutral plane and so as to restrain longitudinal extension of the belt.

In the preferred embodiment of the method of constructing a fiber optic cable a first end of each fiber optic filament is bonded to an electromagnetic radiation source. A second terminal end is placed in a transmitting head in a specific position in conjunction with other filaments for transmission of coherent light images. In the preferred embodiment, the fiber optic filaments are restrained on adhesive surfaces until they are encapsulated by injection molding of elastomeric material.

A method for automatic bonding of fiber optic filaments to light emitting diodes includes as a first step mapping precise LED locations and storing said locations in an electronically readable memory. The next step is to control electronically the relative movement between the LED's and a filament placement device so as to position the two in accordance with the electronically stored locations and place the filaments onto the LED's.

The method for bonding fiber optic filaments onto LED's in the preferred embodiment includes melting a hot melt adhesive layer adjacent to an LED with a precision small area heater and then pressing a fiber optic filament through the molten adhesive so that it seats on the LED. The precision area heater is then removed or shut off. This results in the bonding of each fiber optic filament to this LED without disturbing adjacent bonds and without degradation of the LED or its light transmitting potential.

In the preferred method of bonding fiber optic filaments to LED's, each fiber optic filaments is pressed through a melted adhesive layer on the LED with an axial force which is applied to the filaments at a location spaced from the end of the filament such that the filament buckles and thereby limits the force applied. The axial force is applied by a pinch roller and capstan. The method of bonding fiber optic filaments to LED's can be further characterized by the use of a "V" shaped vacuum guide chuck that holds the filament end precisely on the LED.

The method of producing a fiber optic transmitting head is characterized by using a grooved transmitting head base for seating a first row of fiber optic filaments. After the filaments are seated, two clamps are installed onto the filaments at locations equally spaced either side of the grooves and a second row of fiber optic filaments is then placed onto the first row. Finally, the fiber optic filaments are encapsulated in the transmitting head.

The methods described above may be carried out in an automated fiber optic cable producer characterized by an elongated fiber optic mold, an LED emitter array fixed to that mold, and a fiber feed mechanism mounted on a carrier for movement relative to the fiber optic cable mold. The carrier is used for locating the end of a fiber optic filament on an LED in the emitter array and routing that filament along the mold.

In the preferred embodiment of the automated fiber optic cable producer the fiber optic cable mold is also mounted for movement.

Further refinements of the fiber optic cable producer include use of a fiber cutting station for termination of fiber filaments. It is further useful to have an electronic control for controlling the movements of the cable producer mechanisms.

BRIEF DESCRIPTION OF THE DRAWINGS

The foregoing and other objects, features and advantages of the invention will be apparent from the following more particular description of the preferred embodiments of the invention as illustrated in the accompanying drawings in which like reference characters refer to the same parts throughout the different views. The drawings are not necessarily to scale, the emphasis instead being placed upon illustrating the principles of the invention.

FIG. 1 is an isometric view showing a lightweight fiber optic belt, embodying this invention, with an integral transmitting head and a LED light source array.

FIG. 2 is a front plan view of the fiber optic transmitting head at the transmitting surface with a magnified view of fiber optic filaments.

FIG. 3 is a side elevation of the fiber optic transmitting head.

FIG. 4 is an isometric view of the integral LED light source array of FIG. 1 with a portion broken away.

FIG. 5 is a cross section of the light source.

FIG. 7 is an isometric view showing the routing of the fiber optic filaments upon the lower shell of the mold of FIG. 3. The filaments are routed from the LED light source array of FIG. 4 to the transmitting head of FIG. 3.

FIG. 8 is a schematic view showing the routing of fiber optic filaments upon transverse elements.

FIG. 9 is a schematic front elevation of an automated fiber optic cable manufacturing robot embodying this invention.

FIG. 10 shows a schematic overhead view of the automated fiber optic cable manufacturing robot of FIG. 9.

DETAILED DESCRIPTION

Figure 6:
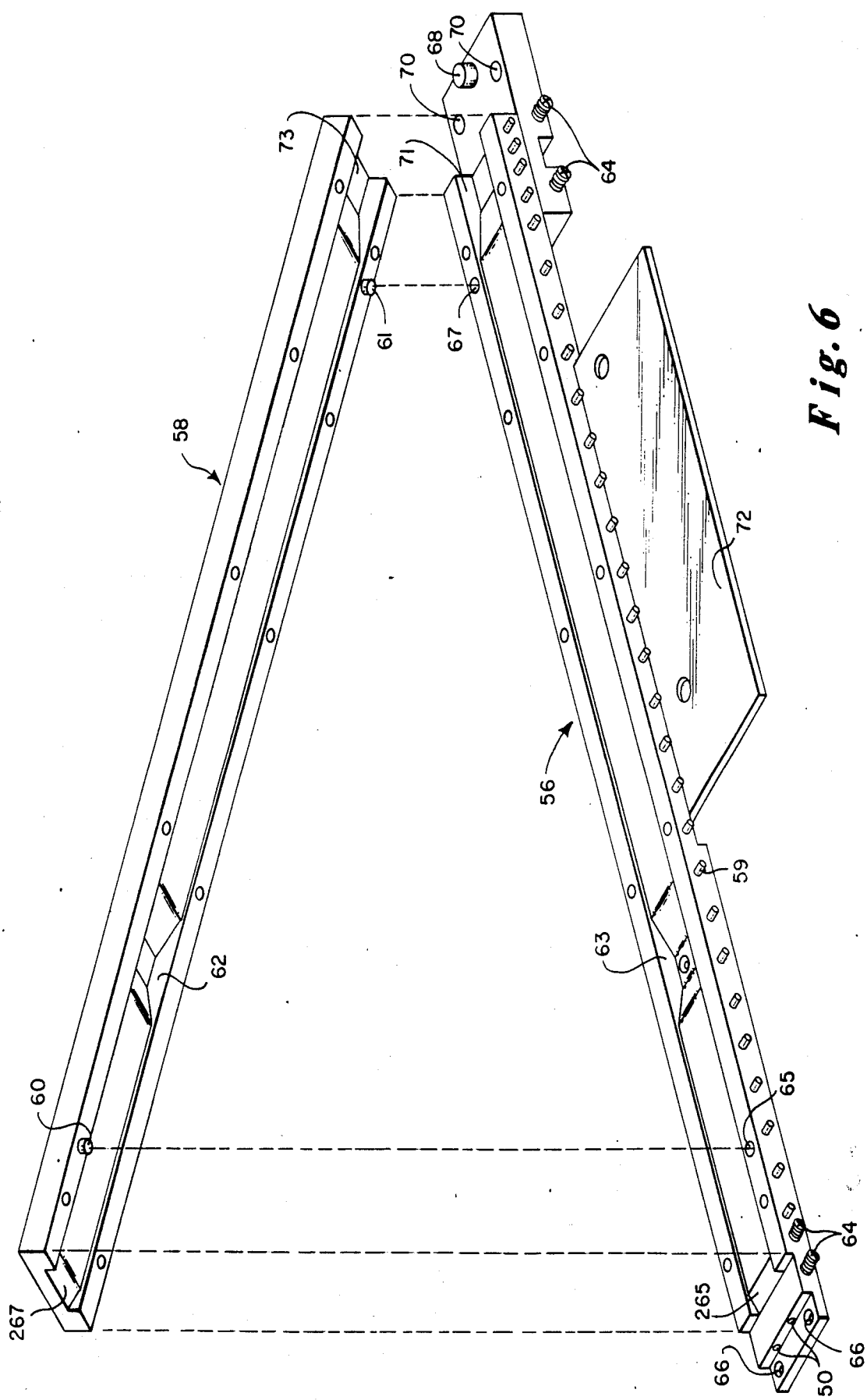
FIG. 6 is an isometric exploded view of the mold used to produce the fiber optic cable of FIG. 1.

A fiber optic cable 16 embodying this invention is shown in FIG. 1. The flexible cable 16 of molded flexible plastic is integrally connected to a light source 22 and a transmitting head 26. The flexible belt may be mounted in a fourth generation phototypesetter for use in the manner disclosed in the above mentioned U.S. patent application Ser. No. 181,312, now U.S. Pat. No. 4,342,504. The input end is illuminated by a matrix of Light Emitting Diodes (LEDs) within the source 22 and the output end is positioned within a printing head having at least one linear array of embedded fiber optic filaments 34. In the phototypesetter system (not shown), means are provided to scan the transmitting head across a photosensitive material and record a line of type thereon. The film is thereafter stepped by a stepping motor and the scanning is repeated for another line of type. The belt has a drastically reduced number of fiber optic filaments in contrast to the thousands of filaments called for in prior fiber optic cables. In addition, the fibers are carefully arranged so as to form a coherent light image with the selective illumination of individual LEDs.

Flexibility of the fiber optic belt enables rapid scanning of the print head across the photosensitive material. Stress relief is provided in areas 18 and 20 by greater belt thicknesses. This minimizes flex and stress in the mounting areas where the fiber optic belt is connected to the movement mechanisms of the phototypesetter. The belt is mounted to the phototypesetter at the light source 22, the transmitting head flange 27 and the mounting bracket 19. The transmitting head is bolted in place in the phototypesetter using holes 41 on the flange 27.

The break away view of a portion of the belt in FIG. 1 shows a section of the major neutral plane of the belt and the fiber optic filaments 34 embedded within it. Fiber optic filaments 34 are embedded in a flat array along the neutral plane, which is the central plane along the length of the belt in which the cable is neither in tension or compression during bending of the belt in a direction perpendicular to that plane. This phenomena is due to the symmetry of stresses about the belt's central plane during bending; material to one side of the plane is in compression while material to the other side is in tension. The fiber optic filaments are embedded along the neutral plane so that they will not be unduly stressed by normal flexing of the belt during printing operations.

To each side of the filaments, flat rigid steel strips 25 are also embedded in the belt. The steel strips may be perforated to enhance their tight encapsulation within the belt. These strips serve to allow flexing of the belt only in the direction perpendicular to the neutral plane. This flexing is the only flexing that is required by the phototypesetter. Any flexing in other directions would stress the fiber optic filaments and increase the chances of filament breakage. The flat strips 25 also are attached to the light source 22 and transmitting head 26 so as to prevent elongation of the belt.

The light source 22 houses light emitting diodes (LEDs) 48 shown in FIG. 4 and supports their required circuitry including an integral electrical connector 24. The LEDs are in an array consisting of 16 columns, each of which contains 8 LEDs, for a total of 128 individual light sources. Preferably the LEDs are of the type having a centered circular aperture on a metallized plane. Each light source LED is connected to the input end of one fiber optic filament. The light emitting diodes are selectively illuminated to provide the image displayed at the transmitting head 26. The selective illumination and the movement of the transmitting head are synchronized to create lines of print when used in the phototypesetter.

FIG. 2 is a front planar view of the fiber optic transmitting head. In the blowup may be seen the array of fiber optic filaments 34 used for light transmission. The two level array of filaments is embedded, between a base 37 and an upper portion 36 of the head 26, in a cyanoacrylate potting material 35 which is poured on the filaments through access hole 43. Cyanoacrylate is an extremely hard and rigid clear cement. The fiber optic filaments are mounted in the central plane of the head, consistent with their position in the flexible belt. The bottom layer of the filaments is set in the grooves 39 in the base 37 of the transmitting head, which aids in their positioning. The grooves may also be seen in FIG. 22, a view of the disassembled transmitting head. The top layer of filament is slightly displaced so as to lie between filaments of the bottom layer. The filaments as positioned here leave no gap or non-illuminated area when driven across photosensitive film.

In FIG. 3, which is a side view of the transmitting head, it can be seen that both portions of the head combine to form an angled transmitting surface 32 and an integral cable anti-pullout lock 38 as shown. The anti-pullout lock serves both to prevent separation of the head and to relieve stress on the fibers and the cable itself produced by the motion of the transmitting head in the phototypesetter. Mounting flange 27 with bolt holes 41, unitary with the base 37, is used to mount the transmitting head in the phototypesetter. The upper portion 36 of the transmitting head is secured to the base with screws 40.

FIG. 4 is an isometric view of the base of the light source 22, shown in its entirety in FIG. 1. Light emitting diodes 48 are shown in a matrix 180. The lines over each LED represent the placement of the individual fiber optic filaments 34. Also shown is the electrical connector 24 which connects the LEDs to a digital electronic control in the phototypesetter.

The electronic control directs the selective illumination of the LEDs so as to produce coherent images at the transmitting head of the fiber optic cable. In this embodiment each fiber optic filament 34 is associated with a particular LED 48 at the light source 22 and is placed in a particular position at the fiber optic transmitting head 26. This allows for operationally equivalent fiber optic belts that can be mass produced. The ordering and the placement of the filaments will be discussed below in the description of the fiber optic belt manufacturing robot.

FIG. 5 is a cross sectional view of the light source with its attached cooling system. The light source 22, as previously shown in FIG. 4, has an LED matrix 180 mounted on a temperature diffusion plate 182.

Light emitting diodes produce not only visible light but heat, and a major limitation on the diodes is their operating temperature. The more electricity that passes through the diode, the brighter the illumination. However, beyond a certain current the diode will overheat and degrade. In order to increase the visible light output, the LEDs in thus invention are cooled. This allows a relatively high current to pass through the LEDs, in order to produce bright illumination without producing overheating and damage.

Energizing a thermoelectric element 184 results in the creation of a cool surface and a warm surface on the element. The cool surface faces the diffusion plate 182 while the warm surface faces the heat sink 186. The heat sink serves to transfer heat energy into the environment. In producing heating and cooling surfaces, the thermoelectric module removes heat energy from the LED matrix 180 and the diffusion plate 182 and transfers it to the environment through the heat sink 186.

The thermoelectric module actively cools the light emitting diodes. For example, if the environment is at 70 or 80 degrees Fahrenheit, the thermoelectric module will maintain the LED temperatures at 60 degrees Fahrenheit through the use of proper modulating means. Since the LED matrix 180 is operated below the ambient environmental temperature of the machine in operation, it is insulated from its environment to prevent added heat load on the LED matrix.

To thermally isolate the LED array, the diffusion plate 182 is suspended within a well in a frame 187. The plate 182 is suspended by pins 192. The resultant gap between the LED circuit board 180 and the connector 24 is bridged by lead wires 190. Steel walls 194 surround the frame 187 and serve as a mold for insulating materials. So as to provide adequate heat transfer properties, heat sink epoxy is applied between the LED matrix 180 and the diffusion plate 182. On both sides of the thermoelectric module 184 are applied a heat sink grease which improves the heat transfer characteristics between thermoelectric module 184, the diffusion plate 182 and the heat sink 186.

Insulating and protective materials are positioned at and above the junction of the LED matrix 180 and the fiber optic filaments 34. A layer of semi-flexible epoxy 185 is placed directly upon the LED matrix 180. Above the epoxy layer is a sealed reservoir of liquid epoxy resin 197 which allows for thermal expansion and contraction of the fiber optic filaments. A solid layer encapsulating the fiber optic filament leads and LED junctions would cause breakage of the fragile filaments during normal environmental temperature transients. The liquid resin 197 is sealed in by an aluminum seal, or boat 189 which is positioned by dimples against the steel walls 194 and sealed with a cured epoxy seal 191. The underside of the boat 189 is covered with a polymer tape which prevents chafing of any fiber optic filaments that may contact the boat. Above the boat 189 is placed a rigid layer of insulating urethane foam 188. Finally, the light source is capped with an aluminum top 193 that is affixed to the steel frame 194 with epoxy.

The light source is permanently connected to the fiber optic belt as can be seen by the anti-pullout lock 23 (FIG. 4).

FIG. 6 is an isometric view of the mold used to cast the flexible central portion of the fiber optic belt shown in FIG. 1. The mold is used both for supporting the fiber optic filaments and to direct the flow of injection molding material. The base mold 56 and the top mold 58 are placed around the fiber optic filaments before the molding substance is injected. When the mold is closed, pins 60 and 61 are inserted into holes 65 and 67. These align the mold properly for assembly prior to injection of molding material.

The depressions 62, 63 and 71, 73 in the mold are used to create the stress relief areas 18 and 20 shown in FIG. 1. As noted above, these areas are used for mounting the fiber optic filament into the phototypesetter and, by their increased thickness, reduce the stress in those areas.

Pegs 59 are used for the installation of transverse, filament supporting elements. These elements 79 (FIG. 7), consist of lacing wrapped about the pegs 59. The lacing is restrained by screw compressed springs 64 at each end of the base cable mold 56. The compressed springs 64 serve to evenly hold and tension the transverse supporting lacing so that the lacing will properly support the fiber optic filaments routed along the length of the mold at about what will become the neutral axis of the completed belt. This can be seen in FIG. 7 where the fiber optic filaments 34 are installed upon the lacing 79.

The transverse support lacing 79 is installed in two layers. The first layer extends across the mold from pegs 59 and serves to support the fiber optic filaments along the neutral axis. After the fiber optic filaments have been laid loosely across the first layer, the second layer is laid across the filaments. The second layer lacing extends from the same positions utilized for the first layer.

During assembly of the mold, holes 50 at the left end of the bottom mold 56 are used to align and assemble the fiber optic transmitting head base 37 to the mold (FIG. 7). During molding, the upper transmitting head 36 (FIG. 1) is fixed to the base 37. Plastic material is injected into the head 26 and into the mold through a hole 30. After the molding substance has been injected into the mold and the cable manufacturing process is completed, the fiber optic transmitting head is disconnected from the mold. This frees the head to become a permanent part of the cable assembly. The molded antipullout lock 38 (FIG. 3) serves to secure the transmitting head to the fiber optic cable. A stress relief area is formed by inclines 265 and 267 at the left end of the mold.

Pin 68 and holes 70, FIG. 6, are used to assemble the fiber optic belt mold to the frame 187 of the light source 22, shown in FIGS. 4 and 5 during the assembly process. The pin 68 is inserted into a hole (not shown) in the bottom of the light source frame 187, and the light source is bolted to the mold through the holes 52 (FIG. 4) and 70 (FIG. 6). As with the fiber optic transmitting head, when the molding process is complete, the light source is detached from the mold and remains with the belt. The molded antipullout section 23 of the cable serves to secure the light source to the cable.

Plate 72, shown in FIGS. 6 and 7, is fixed to the base mold 56 and is used to assemble the base mold to the manufacturing robot discussed below. The secured base mold can then be precisely positioned allowing for precision routing of fiber optic filaments. Holes 66 at the left end of the mold serve to secure the tack cylinder 150 (FIG. 18) to the base mold 56.

FIG. 7 is an isometric view of the base mold 56 previously shown in FIG. 6. In this view the fiber optic filaments 34 are shown installed upon what is to be the neutral plane of the cable and are supported by monofilament lacing 79 which has been strung upon the mold. Both the LED light source 22 and the transmitting head base 37 are shown attached to their respective ends of the fiber optic cable mold in this view. Each fiber optic filament shown in the assembly is associated with a particular light emitting diode 48 in the LED array 180 and is routed to a particular position in the fiber optic transmitting head 37. To create a coherent light image, each fiber in the fiber optic cable individually follows a specific route on the mold assembly.

Initially, sixty-four (64) fiber optic filaments are individually bonded to LEDs and routed to form a first layer of filaments in the cable. Each fiber is tapped onto adhesive pads at each end of the cable as it is routed so that it maintains its position. After the first layer of fibers has been laid out, clamp 108 is placed over the filaments at the fiber optic light source, and a second clamp 140 is placed over the filaments at the transmitting head 37. These clamps serve to restrain the first layer of fiber optic filaments so that they will not be displaced from their planned positions by the weight of the second layer of filaments. A new adhesive pad is then placed on each clamp. The second layer of sixty-four (64) fiber optic filaments is then automatically laid over the clamps and tapped onto the new strips of adhesive to maintain position.

After the installation of the second set of fiber optic filaments, a second set of monofilament support lacing 79 is added on pegs 59. The lacing terminates at the screw compressed springs 64 which maintain the proper tension for support of the fiber optic filaments.

Each filament maintains a definite relationship between its individual light emitting diode 48 and its position in the transmitting head 37. This allows use of the fiber optic transmitting head to produce definite images from electronically controlled LED array 180. Each fiber optic cable manufactured produces the same image from the same computer program which allows for mass production.

FIGS. 9 and 10 are schematics of the fiber optic cable manufacturing robot used to fabricate the fiber optic cable. FIG. 9 is a front view and FIG. 10 is a top view. These schematics highlight the basic movements available to particular subassemblies of the robot. These movements are required for accurate placement, routing and cutting of the fragile fiber optic filaments.

A fiber placement station 80 is stationary and serves as a position reference to the remainder of the system.

Upon a stationary base 85 rides the X1 carriage 75. The X1 carriage 75 is propelled along the X axis by X1 motor 84.

The cutting station 90 rides with fiber optic cable mold upon the Y1 carriage 74 which is capable of movement along the Y1 axis. A Y1 motor 87 which is used for this movement is mounted upon the X1 carriage assembly 75. This format allows total movement of the fiber mold 56 and cutting station 90 in an X/Y plane. The movements of the mold 56 and the cutting station are the same, therefore the distance between the cutting station and the end of the fiber mold cannot vary, and the fiber optic filaments are always cut at the same distance away from the end of the fiber mold.

The Y1 carriage 74 carries the fiber optic cable mold assembly including the fiber optic cable base mold 56, the fiber optic light source 22 and the fiber optic transmitting head base 37. X/Y movement of the fiber mold 56 allows for precision positioning of the LED array below the fiber placement station and precision placement of the fiber optic filaments upon the target areas of the array. Both the X1 and the Y1 motors are precision stepping motors and are controlled with exact precision to make the fiber mold move such that the proper light emitting diode is lined up with each fiber optic filament.

Riding upon a fixed assembly 55 is the fiber carrier 94. The fiber carrier 94 contains the spool of fiber optic filament which is to be led out upon the mold 56. The filament spool is controlled in conjunction with the movement of the fiber carrier. The fiber carrier 94 is moved along the X2 axis by motor 78 from the placement station 80 along the base mold 56 to the cutting station 90 while feeding out fiber optic filament. A Y2 motor 82 for Y2 axis movement of the carrier 94 is mounted on the fiber carrier itself. The two motors allow for total precision movement of the fiber carrier in the X/Y plane.

During operation, the fiber carrier is moved to the fiber placement station and feeds a fiber optic filament through a stationary fiber vacuum chuck 102 (FIG. 11) to the LED light source 22. After the filament is attached to an LED 48, the carrier routes the fiber optic filament along the fiber optic cable mold 56 to the transmitting head 37 and the cutting station 90. The filament is cut after it has been laid into the transmitting head 37, and the fiber carrier is returned to the fiber placement station for continued filament placement.

For precision fiber filament routing it is necessary that the fiber carrier move with precision in the X/Y plane. Once the fiber mold 56 is in position with respect to the fiber placement station 80 (FIG. 9), it is the fiber carrier 94 that controls the routing of the fiber optic filament from the LED to the transmitting head. It should be noted that the movements of the fiber carrier and the fiber mold are precisely coordinated through use of electronic controls.

Figure 11:
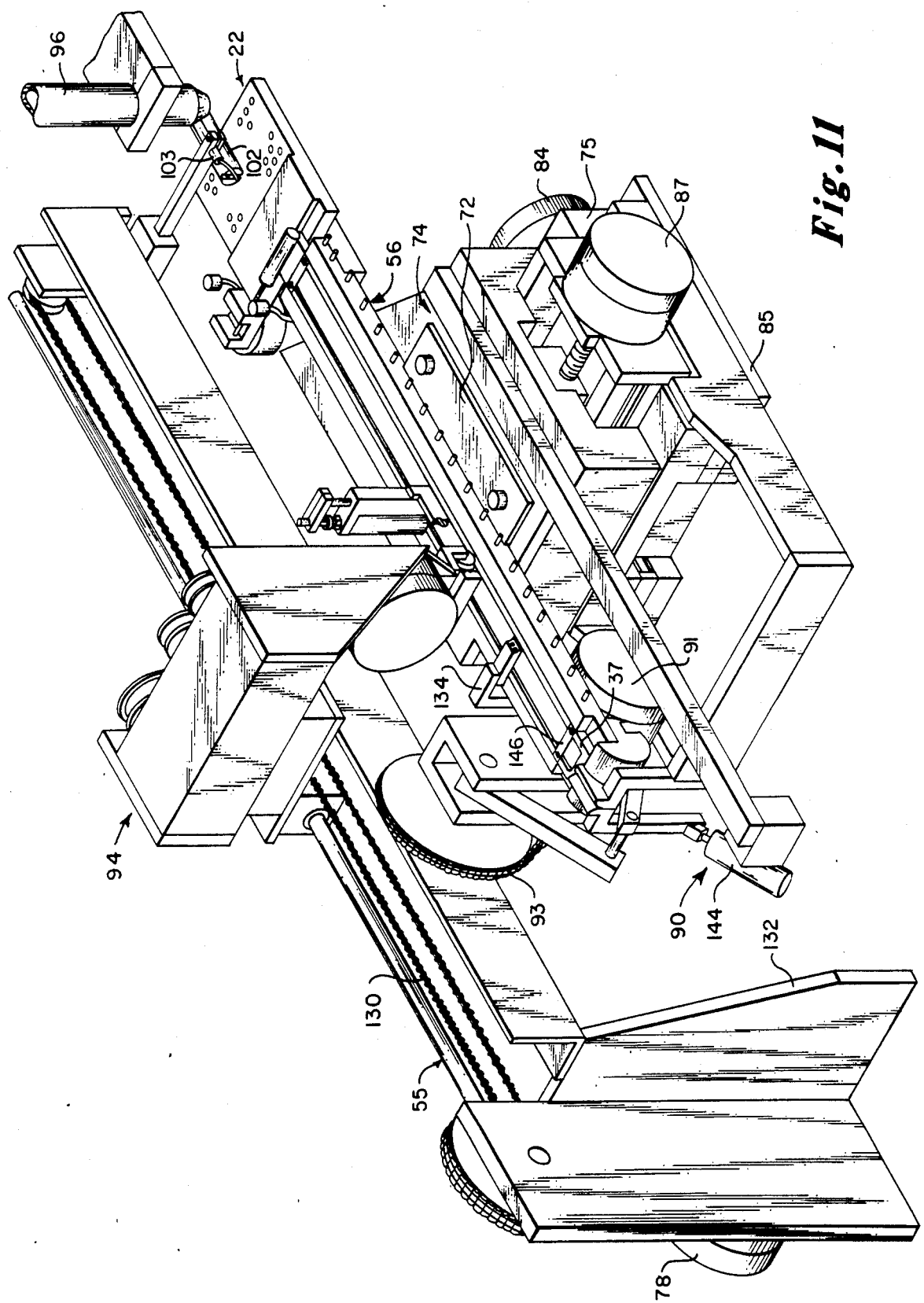
FIG. 11 is an isometric frontal view of the fiber optic cable manufacturing robot shown in the schematics of FIGS. 9 and 10.

FIG. 11 is a left front isometric view of the fiber optic cable manufacturing robot shown in the schematics of FIGS. 9 and 10. The fiber carrier 94 is shown positioned over the fiber optic mold 56 as it would be in the process of routing a fiber optic filament (not shown) from the light source 22 to the transmitting lead base 37. This view is particularly helpful in considering the movement of the fiber carrier 94. It will be described in detail below how the fiber carrier leads a fiber optic filament into the vacuum fiber chuck 102 and presses it onto the emitter surface of a light emitting diode 48.

The fiber carrier is moved along the cable mold 56 by means of the X2 motor 78 and a drive chain 130. As it moves, the fiber carrier routes the fiber optic filament along the cable mold 56. When the fiber optic filament approaches the transmitting head 37, a stationary fiber guide 134 holds the fiber in the correct position along the cable mold 56 relative to the transmitting head until the fiber is tamped onto the adhesive pad 146 at the interface with the transmitting head. Subsequent to positioning of the fiber in the transmitting head, the fiber is cut at the cutting station 90 and the fiber carrier returns to route another fiber from the light source 22. The X2 motor 78 which controls fiber carrier movement in the X direction is mounted on stationary pillar 132.

One should note in this figure the electric motors that position the fiber mold 56 and cutting station. The base of the fiber cable mold 56 is mounted upon the Y1 carriage 74 and therefore moves exactly with it. The Y1 motor 87 is mounted above the base 85 and moves both the fiber mold assembly and the cutting station. The X1 motor 84, which moves both the carriages 75 and 74 is mounted directly upon the stationary base 85. The cutting station and fiber mold are moved together along both the axes; therefore, the cutting station remains a fixed distance from the fiber mold. This allows for accurate termination of filaments. In FIG. 11 one can also see the cutting station pneumatic cylinder 144 which controls the cutting of the fibers at the cutting station.

Figure 12:
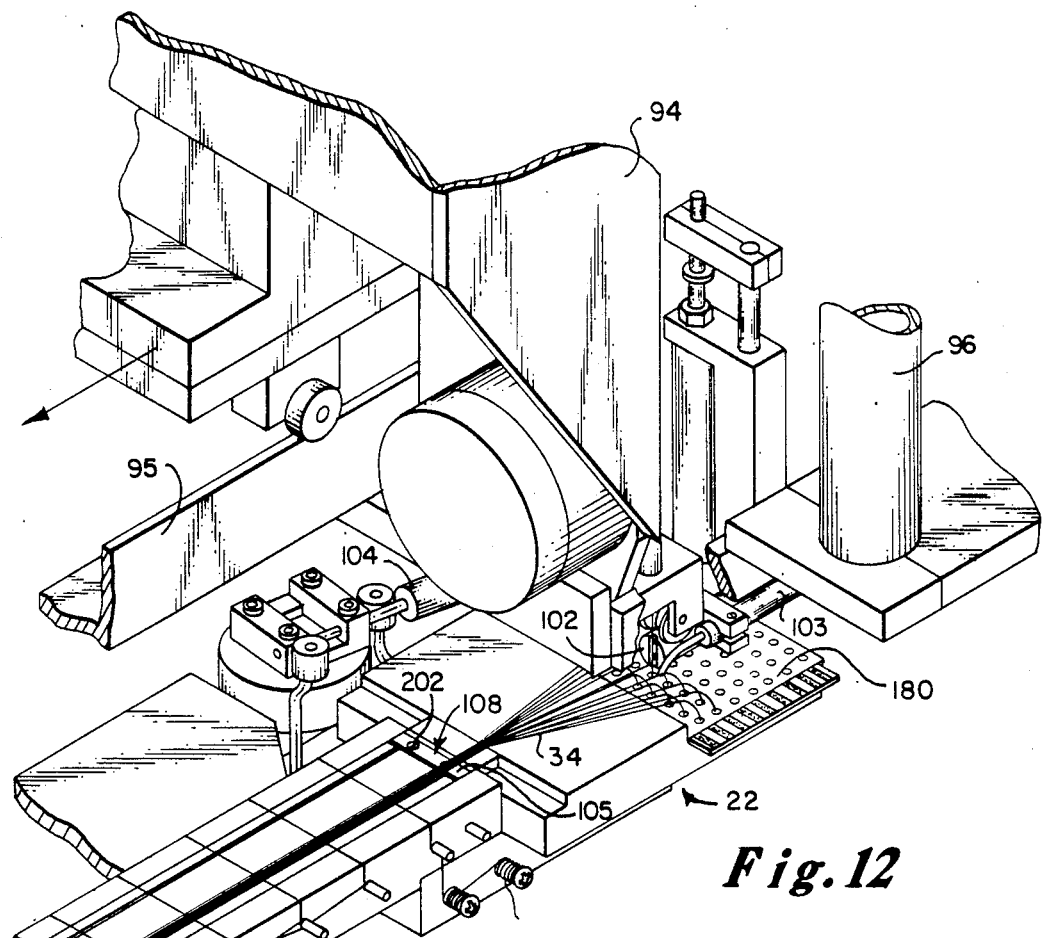
FIG. 12 is an isometric front view of a fiber optic placement station with a fiber optic filament carrier placing a fiber optic filament upon an LED.
Figure 13:
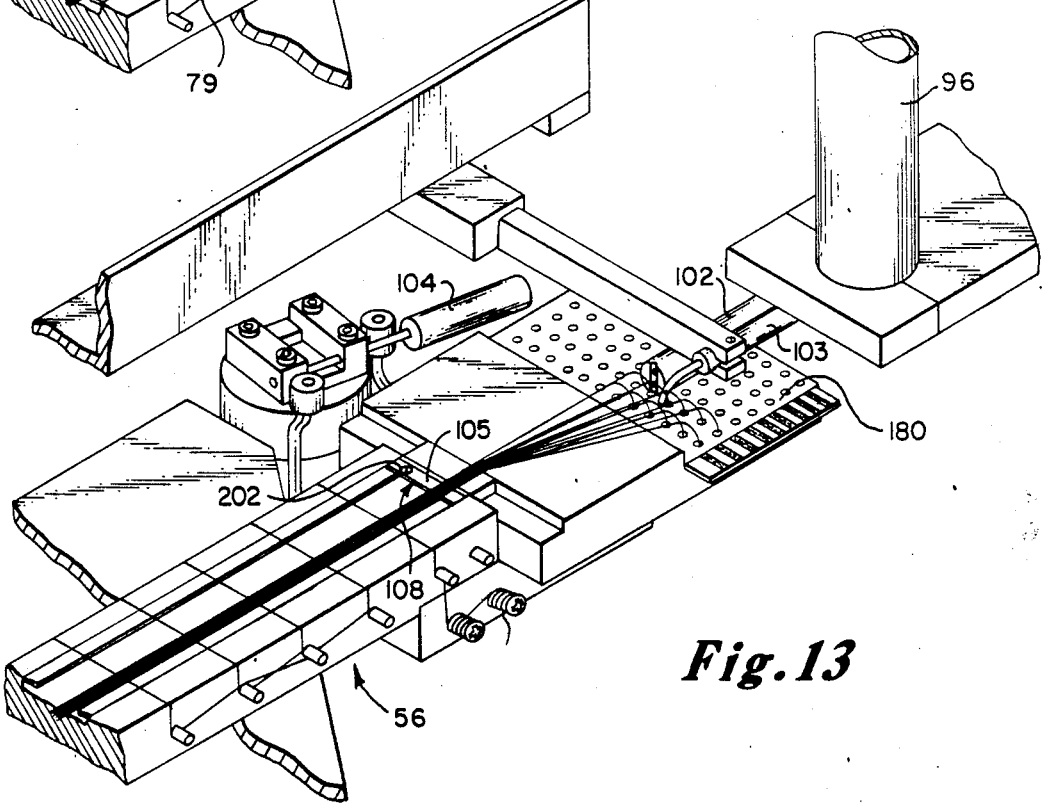
FIG. 13 is an isometric front view of the fiber optic placement station of the robot, a number of filaments having been placed on LEDs and the fiber placement carrier having been moved away.

FIGS. 12 and 13 shown isometric closeup views of the base of the light source 22 at the fiber placement station 80. In these views part of the first row of fiber optic filaments 34 have been laid onto the mold. It can be seen that the fibers are individually connected to particular LEDs in the LED array 180.

In the right hand corner of the figures is a stationary television camera 96 which has a fixed X/Y relationship relative to the "V" shaped chuck 102. The television camera is used by a computer through a sophisticated computer program or a machine operator to view, on a video screen, an enlarged picture of the LED array. Through control electronics, the fiber mold assembly 56 is sequentially moved into position so that cross hairs on the video screen are centered on the most intense emitting area of each LED. When an LED is lined up in the cross hairs of the video screen, the location is communicated to the computer 200 and stored in its memory.

Previewing the LEDS and storing their locations in memory is necessary because the LED arrays, as they are presently constructed, are not identical and the position of brightest emitting area of each LED varies by a few thousandths of an inch between arrays 180. It is of paramount importance to connect the fiber optic filaments with the brightest area of each LED in order to produce a good final image at the transmitting head. In this manner, the information necessary for precision fiber optic filament placement is stored in the computer memory for each particular LED array 180.

High precision is required in the filament placement operation because visible light producing LEDs are limited as to intensity. Increasing LED intensity requires increasing the current through them, and therefore the heat generated, thereby shortening LED life. It is for this reason that, as detailed above, the LED matrix 180 is thermoelectrically cooled. The cooling increases the light that may be transmitted by the LED's. To maximize LED visibility and to produce a good image at the transmitting head, the maximum advantage must be taken of the light emitting area. It is further required that the filament be properly seated and well bonded to the LED target area. The manner of seating the fiber optic filament will be described below. In FIGS. 12 and 13, the filament placement process has begun, and the LED array is shown away from the television camera.

In FIG. 12 the fiber optic filament carrier has moved along its track to where it is in position at the stationary vacuum chuck 102 ready to install a fiber optic filament onto an LED of the array 180. The positioning of the LED relative to the chuck 102 is performed by movement of the fiber optic cable mold assembly 56.

Figure 15:
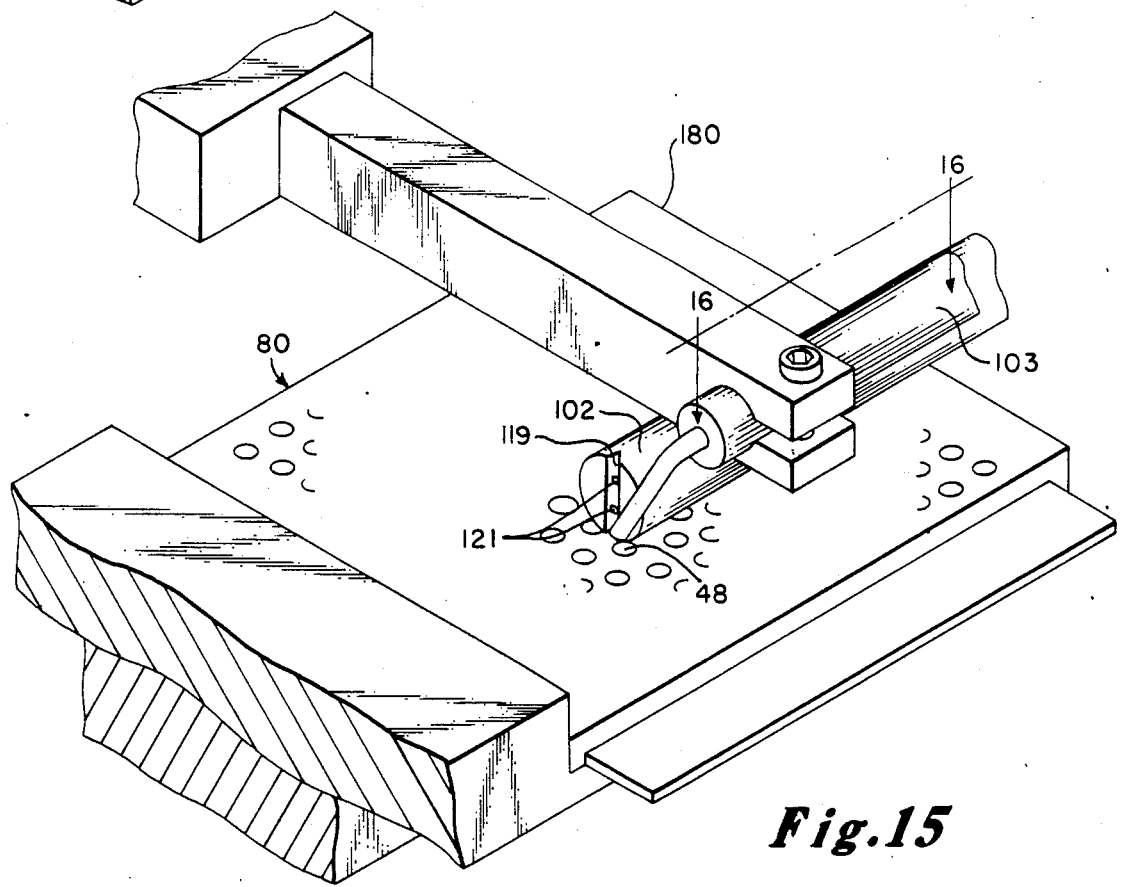
FIG. 15 is an enlarged isometric view of the fiber placement station showing a fiber vacuum chuck which holds the fiber for placement and a precision area heating element.

In both FIGS. 12 and 13, the stationary fiber optic positioning vacuum chuck 102 and heater 103 can be seen above the LED array 180. FIG. 15 is a closeup isometric view of the fiber placement station 80 including the LED matrix 180, the fiber vacuum "V" chuck 102, and the heater 103 in position for the attachment of a fiber optic filament onto the LED array 180. As the filament is fed down from the fiber carrier 94, it passes a "V" groove 119 in the vacuum chuck 102. The LED 48 is precisely positioned relative to the groove so that under control of computer 200 (FIG. 23) the previously mapped LED is aligned for fiber placement on the brightest light emission area.

Ports 121 lead from the "V" groove 119 to a vacuum source. Thus the filament is drawn by the vacuum to fit snugly in the groove for precision placement on an LED in the array 180. With the fiber carrier holding the filament at a LED location, a hot, inert gas jet is directed at the LED from the heater 103. The heater 103 heats a small area of adhesive which has been previously spread over the LED array 180. The adhesive becomes molten in a small area and the end of the fiber optic filament 34 is pressed into and is embedded in the adhesive at the LED emitting surface. The heater is turned off, and the adhesive solidifies about the fiber, thus bonding it to a single LED without disturbing surrounding LED's or filaments. When the filament is properly seated upon an LED and attached through use of the hot melt adhesive, the carrier is commanded by the electronic control to start reeling out filament and to lead the filament along its individual route towards the transmitting head.

Figure 16:
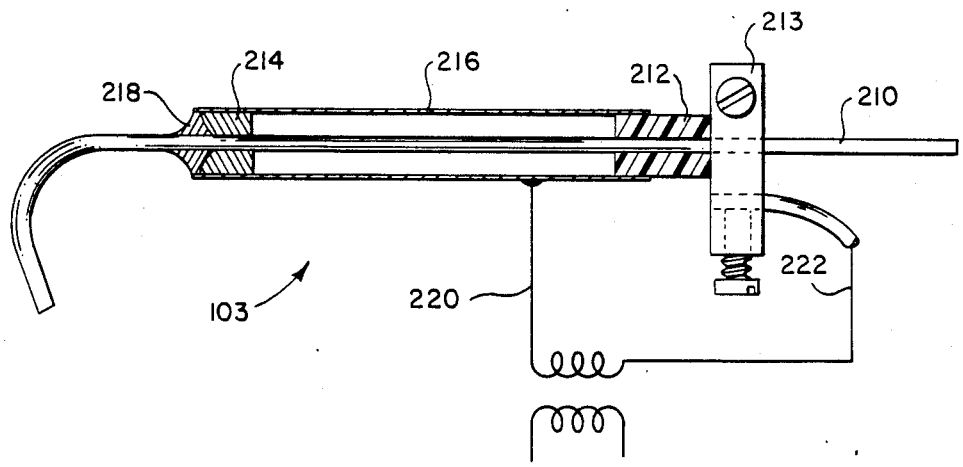
FIG. 16 is a cross sectional view of the precision area heater.

FIG. 16 is a cross-sectional view of the precision area heater 103. In seating the fiber optic filaments 34 upon individual LEDs 48, it is important not to disturb surrounding LEDs and filaments that have already been bonded together. It is therefore necessary that in the bonding process only a very small area of adhesive be allowed to melt. For this reason, the heater 103 was especially designed to exhaust a very small hot jet of gas. It should be further noted that the adhesive used, by its nature, has a very discrete melting point such that above its melting point temperature it is completely liquid while below it, the adhesive bond is adequately formed. The adhesive melting point is also high enough to hold the bond even when the adhesive is heated by LED usage, however, the heat of the precision area heater is not so hot as to destroy or degrade the LED.

In the heater shown in FIG. 16, gas is introduced through the inner tube 210 and passes through a heating section of very thin tubing. This tubing is positioned within an outer tube 216 by a ceramic spacer 212 and a stainless steel plug 214. The stainless steel plug is brazed 218 to both the inner and outer tube to form a solid assembly. The ceramic plug 212 is, however, left relatively loose so as to allow for the expansion and contraction of the inner and outer tubes due to thermal effects; it is retained by clamp 213.

The actual heating is induced by an electric current, one leg of which is sent through the inner tube through clamp 213 and one leg of which is sent through the outer tube. Since the inner tube has a very small wall thickness and a relatively small circumference, it has a high electrical resistance as compared to the outer tube. It is therefore primarily the inner tube that heats up in the completed circuit. A very low voltage (1.5 V) with a high current (20 Amps) is supplied to the heater.

As the gas passes through the extremely hot inner tube, it is heated. The bent end of the tube directs the gas towards the target LED. As with the vacuum chuck the heater is a stationary element; therefore, as the fiber mold 56 is brought into position for insertion of a fiber filament through the vacuum chuck, it is also put into position for heating of the adhesive by the precision area heater 103. One or both of the electrical current and gas flow applied to the heater may be turned off, after a fiber is placed, to allow for cooling of the adhesive.

Figure 17:
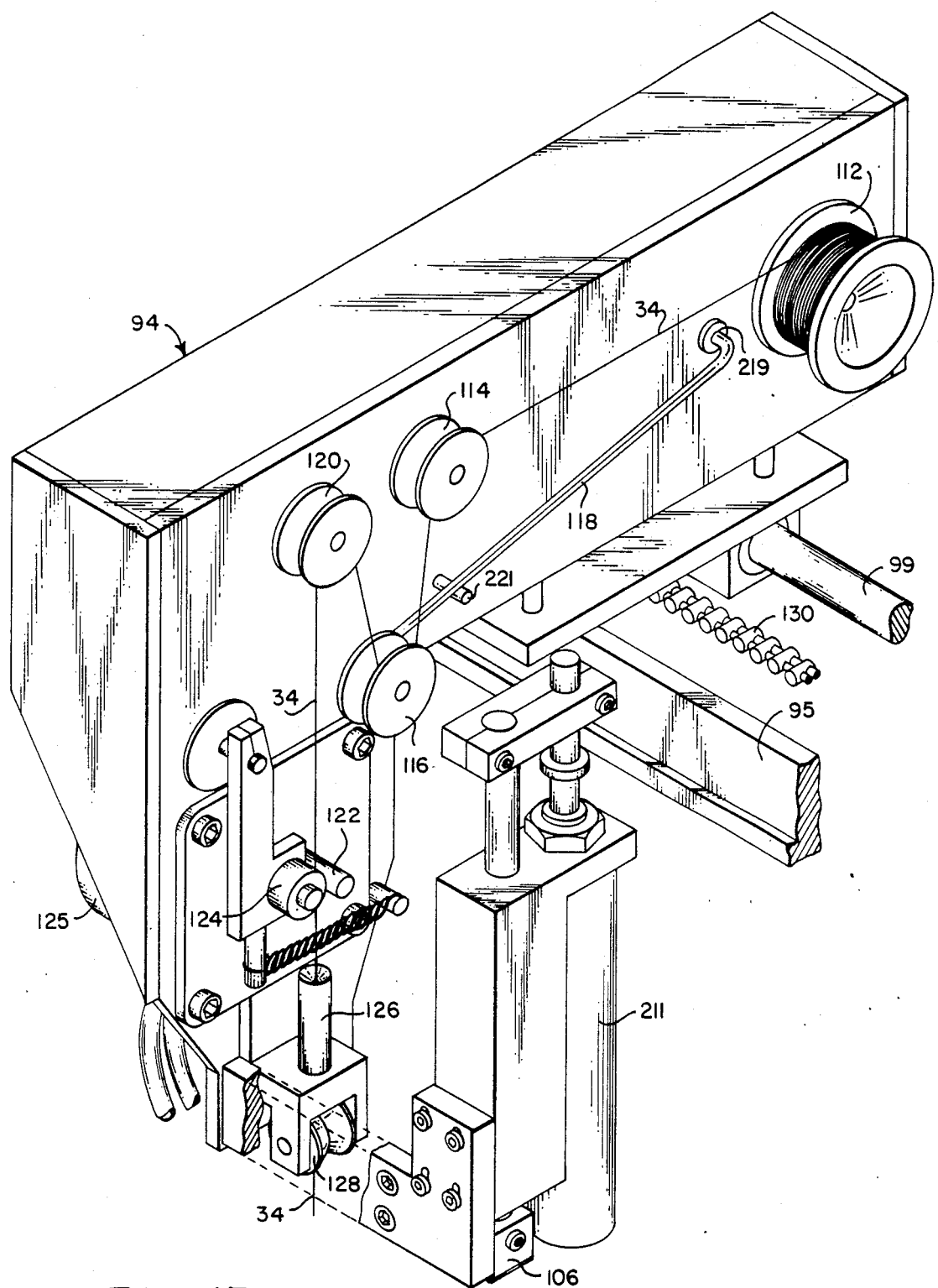
FIG. 17 is an isometric view of the right side of the fiber optic filament carrier which is partially shown from the left in FIGS. 12 and 14.

FIG. 17 is a closeup isometric view of the right side of the fiber carrier 94. This view discloses the threading of the fiber optic filament 34 on the carrier for placement on an LED and routing on the cable mold. The fiber originates at a spool 112 which is actively controlled to maintain near constant filament tension. The fiber is threaded through a series of three rollers 114, 116 and 120 and pulled forward by a capstan 122. The capstan is activated by motor 125. Rollers 114 and 120 are on fixed axes. Roller 116 is attached to a tension arm 118 which is pivoted about a pinlike section 219. The tension arm moves up or down depending on the tension of the filament threaded about the roller 116, but is restrained by stop 221. The pin 219 of the tension arm 118 is attached internally to a shutter associated with a photoelectric sensor (not shown). The photoelectric sensor, in conjunction with electronic circuitry, controls the rotational movement of the fiber optic filament spool 112 so that it operates smoothly in conjunction with capstan 122. The machinery thus maintains a generally constant filament tension when feeding the fiber optic filament and has a fail safe system to prevent excessive filament runout.

After the filament leaves the roller 120, it runs between capstan 122 and pinch roller 124. After travelling a short distance it passes through a guide 126 and then past a roller 128. The fiber is held in the fiber vacuum chuck below the wheel 128 when it is to be pressed against a LED target. When the fiber carrier routes a filament along the cable mold, the filament bends around the roller 128 and is laid directly onto the cable mold.

When the fiber carrier is installing a fiber onto a LED, the pressure of the fiber upon the LED is critical in creating a good seat and a good bonding seal between the fiber and LED emitting surface. It is the fiber carrier that controls this pressure. When the fiber filament hits the LED surface, the filament buckles between the capstan 122 and the guide 126 and the control computer halts the rotation of the capstan 122. An exact elastic force is produced by the buckling of the filament. This force provides the correct pressure necessary to seat the fiber on the LED.

Another important aspect of the fiber feed mechanism is the coordination of movement of the fiber optic spool and capstan 122, by means of the tension roller 116. The fiber spool 112 stops rolling out the fiber filament when the capstan stops because of the release of tension on the tension arm 118. The tension roller 116 drops in position in relation to stationary rollers 120 and 114; this movement through the tension arm 118 activates the previously mentioned photo-electric sensor, and the electronic circuitry stops fiber spool motion.

The process just described makes for reproducible seating of fiber filaments upon each predetermined target area. This is one of the most important functions of the robot. Since each filament is important for image quality, any misaligned, broken or angled filament would result in a greatly deteriorated typeset image. The reader should keep in mind that the fiber optic cable is dependent for its function on only 128 fiber optic filaments. A fault in any filament would result in a significant degradation of image quality.

Figure 14:
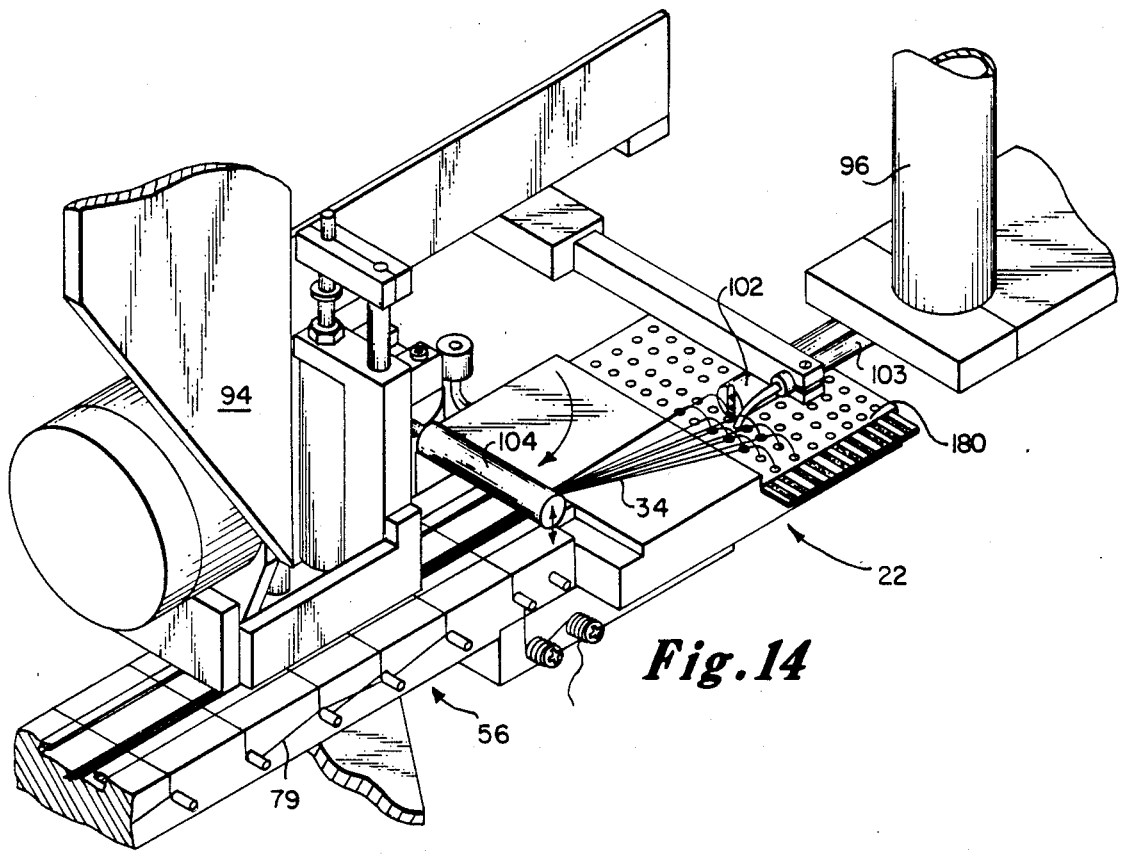
FIG. 14 is an isometric front view of the fiber optic placement station of FIG. 13 with a clamp holding a fiber in place and with the fiber optic filament carrier in the process of routing fiber optic filaments from the fiber placement station along the fiber optic cable mold.

The fiber optic filament is routed from a light emitting diode onto the fiber optic cable mold 56 by X/Y movement of the fiber carrier 94 which simultaneously feeds out the fiber from the spool 112 mounted upon it. It is necessary to attach the filament to an adhesive pad 105 to change the direction of filament feed and properly retain the filament along its route. When the fiber carrier routes the fiber optic filament onto the fiber mold 56, a tamper 104 is rotated and then brought down as shown in FIG. 14 to press the filament onto the adhesive pad 105. The tamper is activated by a two solenoid system, one solenoid rotating the tamper into position and the second solenoid bringing the tamper down onto the fibers. The fiber carrier then proceeds to route the filament along the fiber optic mold 56 and lay it upon the lacing 79. The lacing supports the filaments along what is to be the neutral place of the completed fiber optic cable.

After the sixty-four fiber optic filaments of the first layer are routed along the mold 56, that layer is clamped by a metal strip 108 (FIG. 13) secured by screws to holes 202 (FIG. 12) in the base of the light source assembly 22. A second piece of adhesive is then added on top of the clamp. The clamp 108 prevents disturbance of the first layer of filaments and allows for good adherence of the second layer of filaments during the routing process.

At the opposite end of the mold, each fiber optic filament is brought across an adhesive pad at the transmitting head 26 (FIG. 1), and a tamper 106 (FIG. 20) attached to the fiber filament carrier 94 presses the filament onto the adhesive. When the fiber carrier has completely routed the filament onto the transmitting head, and the filament has been cut at the cutting station as discussed below, the carrier 94 is returned to the fiber placement station to install another filament.

As previously noted, the fiber carrier 94 is capable of moving on both the X2 and the Y2 directions. Not shown in FIG. 17 is the Y2 motor which allows the fiber carrier to index itself in the Y direction across the width of the fiber mold. In the X direction the fiber carrier is pulled along a stationary bar 99 by a plastic chain 130. This chain is moved by the X2 motor 78 which can be seen in FIGS. 9, 10 and 11. The fiber carrier is thereby given complete and mechanically independent movement in the X/Y plane.

Figure 20:
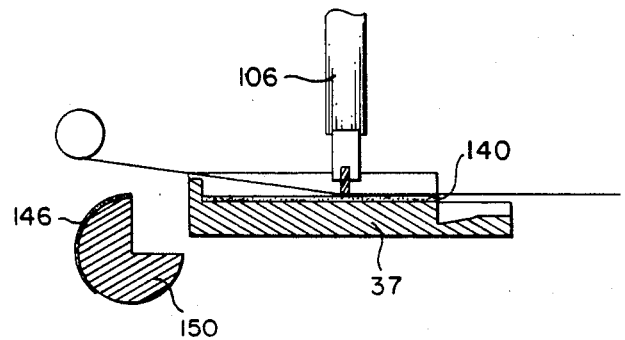
FIG. 20 is a cross-sectional closeup view showing the placement of a fiber optic filament as it is being tamped down onto an adhesive surface by the fiber carrier tamper prior to its positioning in the transmitting head.
Figure 21:
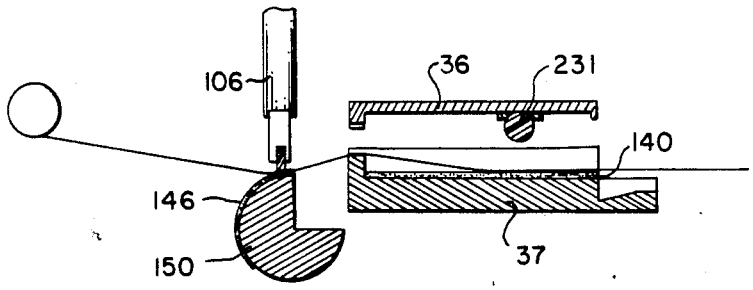
FIG. 21 is a cross-sectional closeup view showing the tamping down of a fiber filament onto an adhesive surface by the fiber carrier tamper after the filament has been positioned in the transmitting head.
Figure 18:
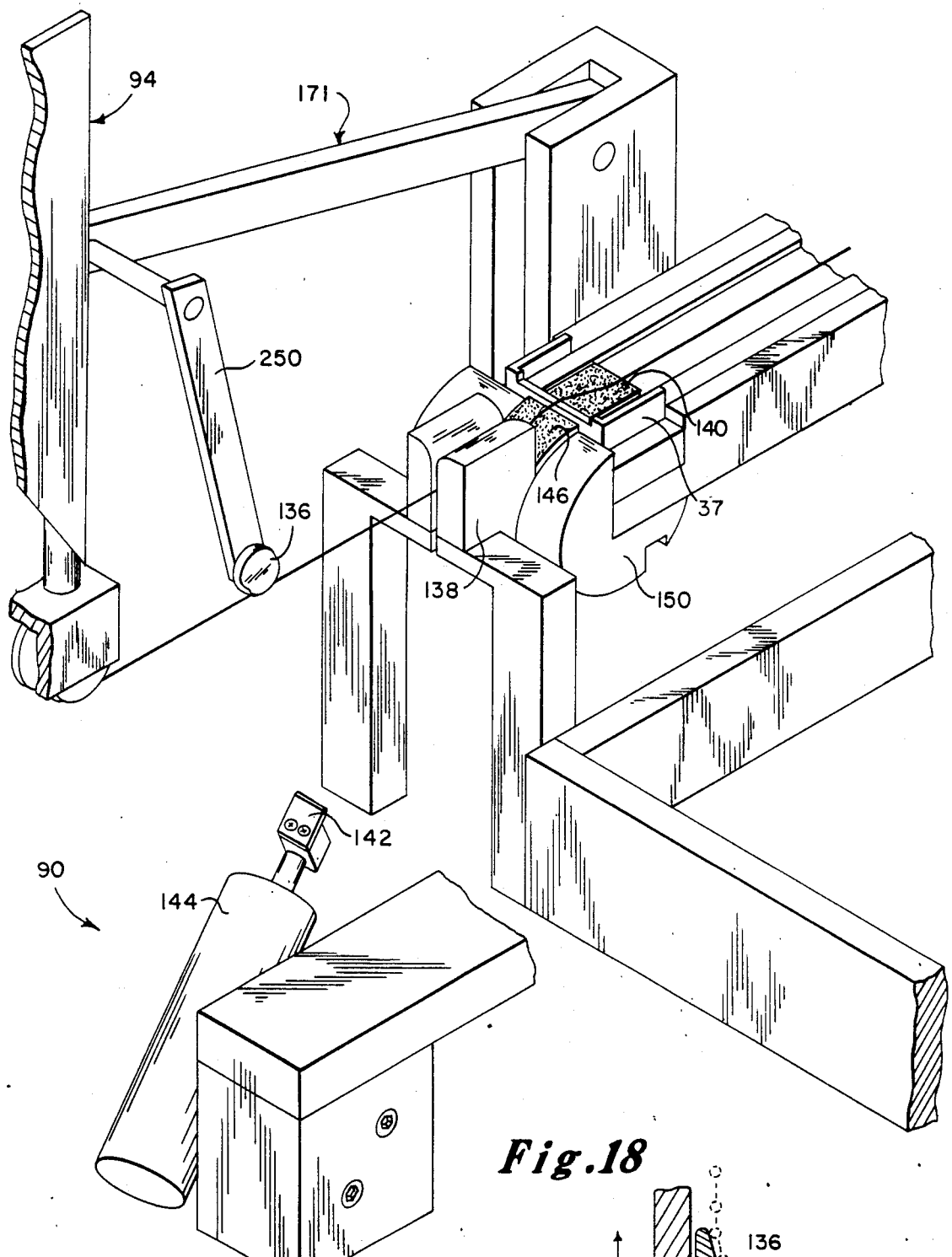
FIG. 18 is an isometric closeup of a fiber optic cutting station.
Figure 19:
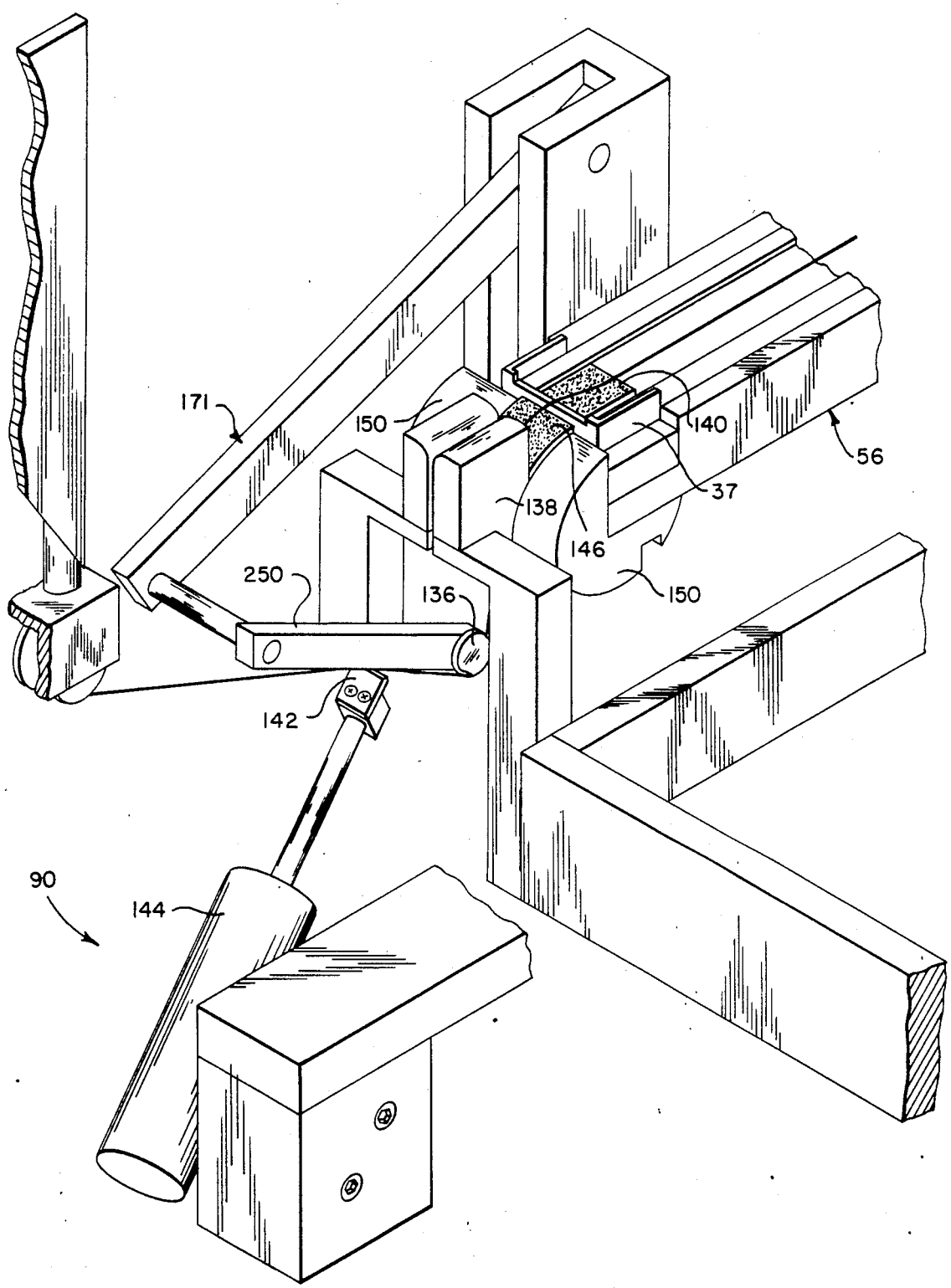
FIG. 19 is an isometric closeup of the fiber optic cutting station of FIG. 18 as a fiber optic filament is being cut.

FIGS. 18 and 19 are isometric views of the cutting station of the fiber optic cable producer robot. FIG. 20 and FIG. 21 are closeup cross sectional views of the transmitting head base during installation of a fiber optic filament. The exploded isometric view of the transmitting head assembly in FIG. 22 will be discussed in conjunction with FIGS. 20 and 21.

Figure 22:
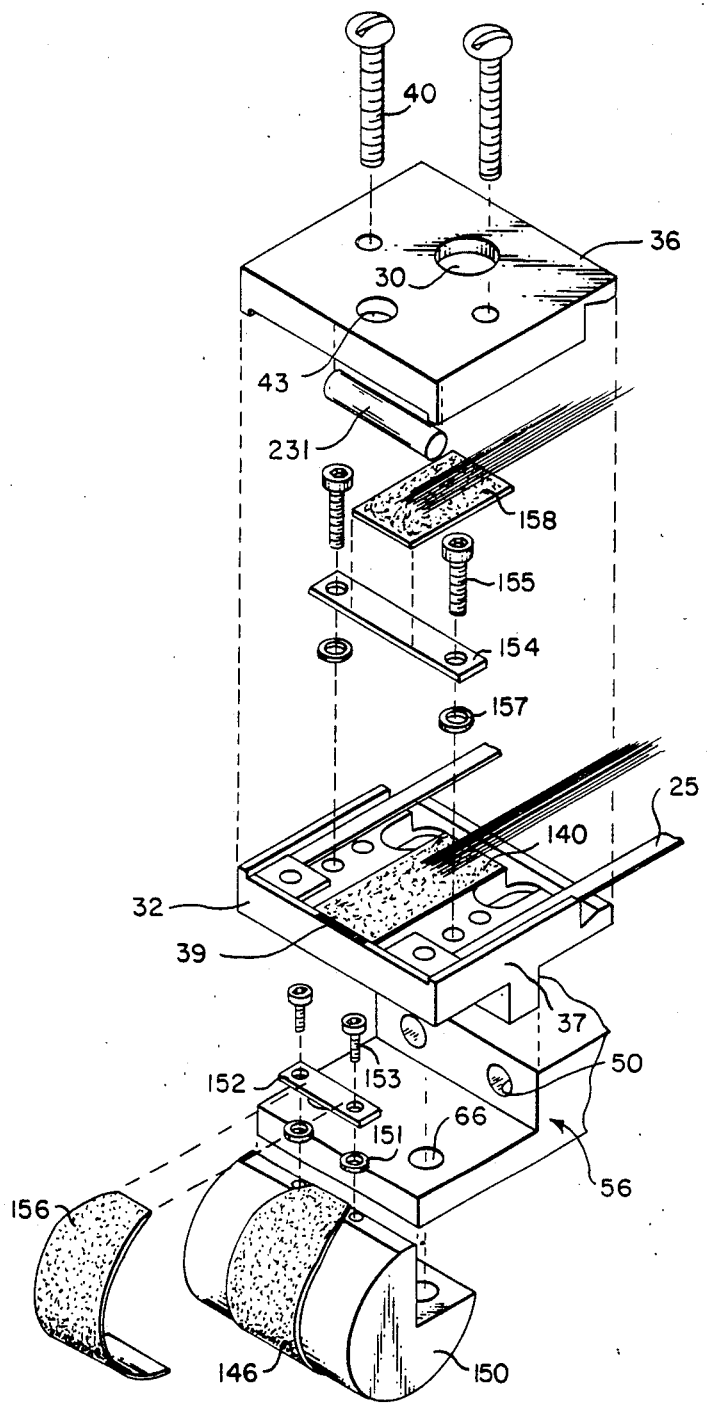
FIG. 22 is an exploded isometric view of the fiber optic transmitting head and the guide tack cylinder showing assembly order.

In FIG. 20, the fiber filament has been routed by fiber carrier 94 across the transmitting head base 37 and is in the process of being seated on the adhesive strip 140, FIG. 22, by the tamper 106 attached to the fiber carrier. The tamper movement is activated by a fast acting pneumatic cylinder 211 (FIG. 17) found on the fiber carrier 94. The fiber filament is precisely led onto its particular groove 39 (FIG. 22) in the transmitting head base 37 and then tamped down by tamper 106 onto a second adhesive strip 146 mounted on the tack cylinder 150 as shown in FIG. 21. The sixty-four fiber optic filaments of the first layer are thereby individually seated on the first layer of adhesive strips and in the grooves 39 (FIG. 22) at the transmitting head. The grooved area 39 of the transmitting head is elevated above the surrounding areas in which the fiber filaments are tamped onto adhesive strips 140 and 146. The filaments are thereby held in a slight tension by this arrangement as shown in FIGS. 21 and 22, this restrains the filaments in the grooves 39 which maintain the filaments within 0.0005 inches of their optimum intended postion.

Following the completion of the first layer of filaments, clamps 152, 154 (FIG. 22) are placed over the first layer of sixty-four filaments in the transmitting head 37 and on the tack cylinder 150. The clamps are secured by screws 153, 155. Washers 151, 157 prevent displacement of the first layer of filaments. Top adhesive strips 156, 158 are laid onto the clamps for the second layer of sixty-four filaments. The second layer of filaments is then laid onto the first set of filaments and sits between them as shown in the FIG. 2, exploded view. The second layer is also held in a slight tension by the adhesive strips as shown in FIG. 21.

After each fiber filament is laid into the transmitting head it must be cut from the filament spool 112 (FIG. 17) so that the next fiber filament may be secured at the light source 22. FIGS. 18 and 19 show the cutting station at two stages in the termination of a fiber optic filament. In these views the tamper 106 has previously pressed down a freshly laid fiber optic filament onto adhesive pads 140 and 146 as shown in FIG. 21.

Figure 18A:
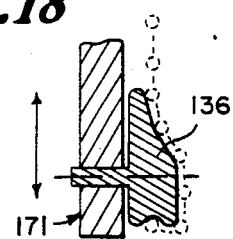
FIG. 18A is a side view of the cutting station bobbin.

When the fiber carrier 94 routes the fiber optic filament through the position guide 138 (FIG. 18) and past the cutting station, a bobbin arm 171 is positioned by motor 91 (FIG. 1) below the level of the fiber carrier as it passes overhead. The bobbin arm 171 is then brought up and the fiber filament slides past the bobbin 136. The special shape of a bobbin 136 as shown in FIG. 18A allows for the passing of the filament. After the filament has slid by the bobbin 136, the cutting arm 171 positions the filament for the cutting operation as can be seen in FIGS. 18 and 19.

In FIG. 19, the bobbin has been moved against the fiber filament and has pushed it down. Also, the fiber carrier 94 has moved the fiber filament under arm 250 and into position where the cutter 142 will be able to cut it. The bottom side of the arm 250 holding the bobbin 136 is covered with a thin layer of semi-compliant material and forms the cutting surface against which the cutter is pushed. The cutter 142 is activated by a fast-acting pneumatic cylinder 144 so as to produce the optically usable cut required.

The cutting operation is an important one because the end of the fiber optic filament which is retracted back onto the fiber optic filament carrier is used as the end of the fiber to be attached to the next light emitting diode in the light source 22. It is therefore necessary that an optically usable filament end be produced by the cutter. The end of the filament that remains extending from the transmitting head will be cut and polished after the completion of the fiber optic belt.

In order to produce the optically usable filament cut, a chromium razor blade is used by the cutter. Each filament is routed to a slightly different location in the transmitting head and at the cutter, and in this way filaments are always severed by a previously unused portion of the cutter blade. After the first layer of 68 fibers is cut, the blade is reversed in its holder so as to present a fresh portion of the blade edge for use on the second layer of filaments.

Finally, after the second layer of filaments is laid onto the fiber optic cable mold assembly, the upper mold 58 (FIG. 5) is secured to the lower mold and the upper head shell 36 (FIGS. 21 and 22) is secured to the lower head shell 37 by screws 40. As the head shell is assembled, rubber gasket 231 (FIG. 21) is compressed against the filaments to further restrain them during potting. Cyanoacrylate potting material is applied through a hole 43 in upper head shell 36 and quickly cured to retain the filaments in position at the transmitting head end face 32. The cable is now ready to be injection molded. Molding material is added through the hole 30 in the transmitting head until it appears at the opposite end of the mold 56, 58.

After the molding material cures the transmitting head 26 and the light source 22 are detached from the cable mold; the cable mold halves 56 and 58 (FIG. 5) are then removed. To facilitate this, the support lacing is cut from the pegs 59, FIG. 5 and trimmed from the cable. The end face of the transmitting head is then polished to provide the completed cable as shown in FIG. 1.

Figure 23:
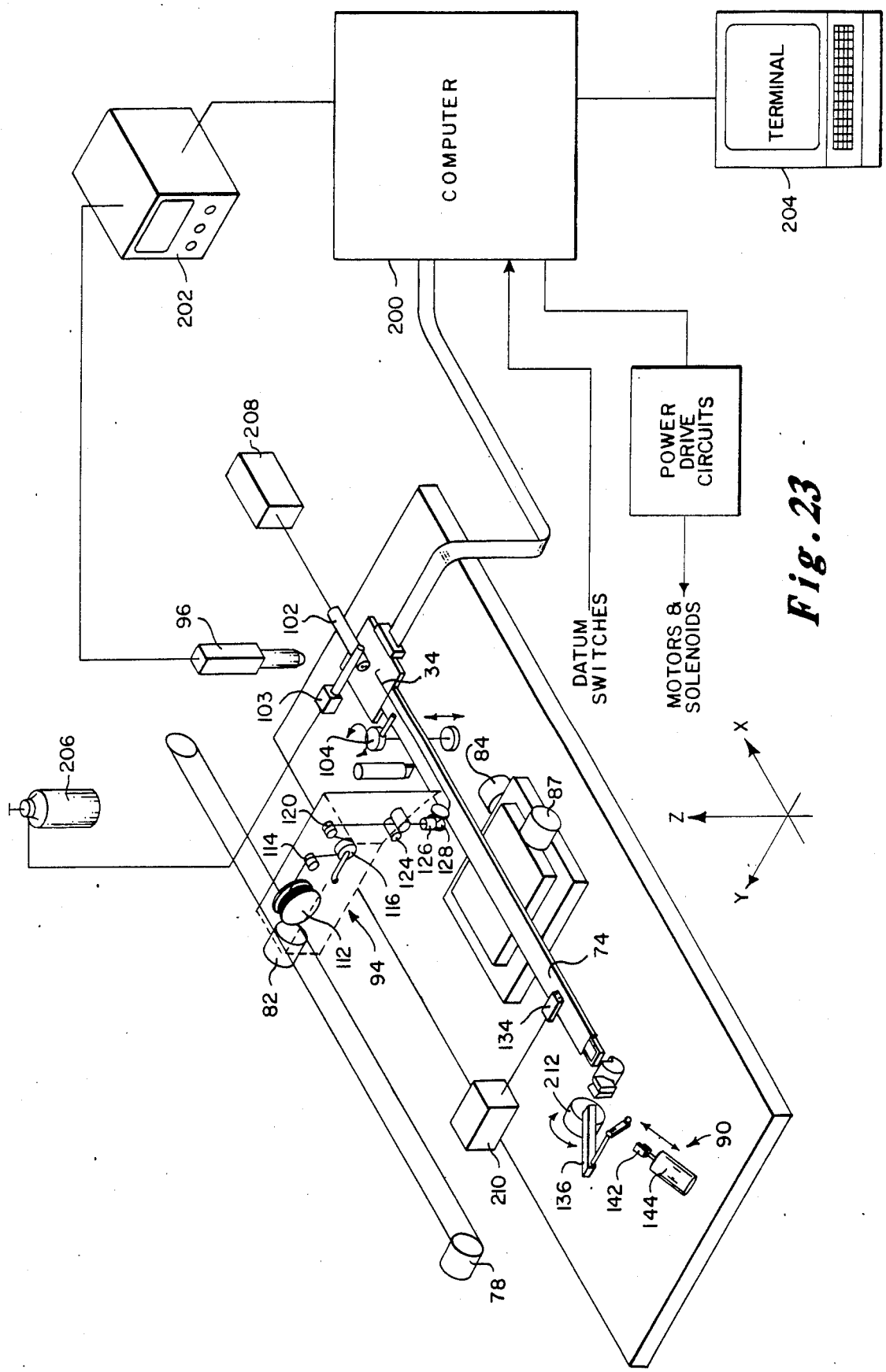
FIG. 23 is a schematic representation of the manufacturing robot and its control system.

The mechanism for producing the fiber optic cable having now been fully discussed, a review of the manufacturing process in conjunction with FIG. 23 will clarify the procedure.

The fiber optic cable producing mechanism is set up by securing an assembly of the lower half of mold shell 56 (FIG. 7), the lower head shell of the fiber optic transmitting head 37 and the LED light source 22 (FIG. 4) onto the Y1 carriage 74. The fiber optic cable mold assembly is then prepared for use by lacing of the transverse support elements 79 which will support the fiber optic filaments 34 upon the lower mold shell 56.

The next important step before operations can begin is the mapping of the LEDs 180 with camera 96 and a viewer 202 (FIG. 23). The viewer 202 is used by an operator or a preprogrammed computer to spot and record in memory the most intense emitting areas of each LED. This information is stored in the computer 200 and used for automated placement of the fiber optic filaments upon the LEDs. Finally, a fiber optic filament is manually threaded from the fiber spool 112 of the fiber optic filament carrier 94 through the rollers 114, 116, 120, 124 guide 126 and roller 128 after which the machine may be set for automated operation.

During automatic operation of the robot, which has been previously described in detail above, many movements and operations are performed. FIG. 23 summarizes these movements and operations in a schematic form. In addition, interfacing support systems are shown.

The heater 103 for bonding of fiber filaments 34 is shown with its nitrogen gas supply 206. During fiber placement, the vacuum chuck 102 holds the fiber in place when the vacuum supply 208 is turned on.

Following fiber placement, tamper 104 taps the fiber onto adhesive. As the fiber carrier 94 travels down the length of the fiber mold 56, it is moved lengthwise by X2 motor 78 and positioned widthwise by Y2 motor 82. The fiber is further held in position by secondary vacuum chuck 134 and vacuum source 210.

During the course of the operations, the fiber mold and cutting station 90 is positioned by motors 84 and 87. The movements of the bobbin 136 and cutter 142 are displayed in this view. Bobbin motor 212 and cutter's pneumatic cylinder 144 are also shown.

This fiber installation process is automatically continued until a first layer of fiber optic filaments along the major neutral axis of the fiber optic cable is complete. Clamps are put in place over the first layer of fibers and new adhesive pads added. A second layer is then added automatically and clamped.

The top portion of the mold and the top portion of the fiber optic transmitting head are installed as the final assembly step.

The closed mold is then removed from the automated fiber optic cable producer mechanism and the fibers are encapsulated.

The final process in the preparation of the fiber optic cable is polishing of the transmitting head to a very high finish so that there will be very little light distortion when the product is in use.

While the invention has been particularly shown and described with reference to preferred embodiments thereof, it will be understood for those skilled in the art that various changes in form or details may be made therein without departing from the spirit and the scope of the invention as described by the appended claims.

We claim:

1. An automated fiber optic cable producer comprising:
    a fiber filament feed mechanism;
    an elongated fiber optic cable mold;
    an LED emitter array fixed to said cable mold;
    a fiber optic cable mold mounted for x/y movement relative to said fiber optic feed mechanism for locating an end of a fiber optic filament at an emitter in said emitter array and routing that filament along said mold;
    a mapping means for determining the most intense area of illumination for each of said LED's of said array; and
    a storage means for storing the precise location of the most intense area of illumination in an electronically readable memory.

2. An automated fiber optic cable producer as claimed in claim 1 further characterized in that said fiber optic cable mold is mounted for movement in said x and y directions relative to a fiber position guide.

3. An automated fiber optic cable producer as claimed in claim 1 further characterized in that said fiber feed mechanism is capable of independent movement in said predetermined plane in increments of about 0.001 inch or less.

4. An automated fiber optic cable producer as claimed in claim 1 wherein said fiber optic cable mold and said emitter array are capable of independent movement in a predetermined horizontal plane in x and y directions in increments of about 0.001 inch or less.

5. An automated fiber optic cable producer as claimed in claim 1 further comprising a cutting station at an end of said fiber optic cable mold opposite to said emitter array for cutting of each filament laid out by said fiber feed mechanism.

6. An automated fiber optic cable producer as claimed in claim 5 further comprising an electronic digital control unit controlling the movement of said fiber carrier, the fiber optic mold and said fiber cutting station.

7. An automated fiber optic cable producer as claimed in claim 1 further characterized by a heater in a fixed location relative to said fiber position guide for liquefying adhesive over an emitter when adhering an end of said fiber optic filament to said emitter.

8. An automated fiber optic cable producer as claimed in claim 1 wherein said fiber position guide is a vacuum chuck for precisely positioning said fiber optic filaments relative to the electromagnetic radiation emitters.

9. An automated fiber optic cable producer as claimed in claim 1 wherein a series of rollers on said fiber feed mechanism route the filaments upon said fiber optic cable mold and a tension arm assembly with a photoelectric sensor is provided to prevent excessive filament runout after said filaments contact said emitter array.

10. A method for automated bonding of fiber optic filaments to LED's comprising the steps of:
    placing one or more LED's upon a carrier of predetermined length and width;
    mapping the most intense area of illumination for each of said LED's and storing the precise location of the most intense area of illumination in an electronically readable memory, said mapping step completed prior to starting any subsequent step;
    electronically controlling relative movement between said carrier and a filament placement device to position said filament placement device and carrier one with respect to the other in accordance with said electronically stored precise locations; and
    placing filaments onto individual LED's by means of said filament placement device.

11. A method of bonding fiber optic filaments to LEDs as claimed in claim 10 further comprising the step of disposing an adhesive at each LED and pressing each fiber optic filament against an LED with an axial force applied to an filament at a location spaced from the end of the filament such that the filament buckles, thereby limiting the force applied to press the filament against the LED and seat the filament in said adhesive.

12. The method for bonding fiber optic filaments to LED's as claimed in claim 10 including the steps of:
  a. selecting said LED's so that each has a predetermined operating temperature and a predetermined degredation temperature.
  b. selecting a temperature sensitive adhesive which liquefies above said LED predetermined operating temperature but below said LED degradation temperature;
  c. pressing said fiber optic filaments onto said temperature sensitive adhesive; and
  d. bonding said fiber optic filaments to said LED's by means of precision area heating of said temperature sensitive adhesive.

* * * * *